(12) United States Patent
Fujikawa

(10) Patent No.: US 12,449,684 B2
(45) Date of Patent: Oct. 21, 2025

(54) LIQUID CRYSTAL DEVICE, ELECTRONIC APPARATUS, AND PHYSICAL PROPERTY MEASUREMENT METHOD FOR LIQUID CRYSTAL LAYER

(71) Applicant: SEIKO EPSON CORPORATION, Tokyo (JP)

(72) Inventor: Shinsuke Fujikawa, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 395 days.

(21) Appl. No.: 17/956,058

(22) Filed: Sep. 29, 2022

(65) Prior Publication Data
US 2023/0099587 A1 Mar. 30, 2023

(30) Foreign Application Priority Data
Sep. 30, 2021 (JP) .................. 2021-160804

(51) Int. Cl.
*G01R 27/28* (2006.01)
*G02F 1/13* (2006.01)
*G02F 1/1333* (2006.01)
*G09G 3/00* (2006.01)
*G09G 3/36* (2006.01)
*G03B 21/00* (2006.01)

(52) U.S. Cl.
CPC ...... *G02F 1/1309* (2013.01); *G02F 1/133308* (2013.01); *G09G 3/006* (2013.01); *G09G 3/36* (2013.01); *G03B 21/006* (2013.01)

(58) Field of Classification Search
CPC .... G09G 3/006; G09G 3/36; G09G 2320/048; G02F 1/133308; G02F 1/136254; G02F 1/1309; G03B 21/006
See application file for complete search history.

(56) References Cited

U.S. PATENT DOCUMENTS

| | | | |
|---|---|---|---|
| 2003/0156231 A1* | 8/2003 | Tsukao | G02F 1/136227 349/43 |
| 2015/0255029 A1 | 9/2015 | Niikura et al. | |
| 2019/0244580 A1* | 8/2019 | Kwon | G02F 1/1368 |
| 2020/0027381 A1* | 1/2020 | Hashimoto | G09G 3/006 |
| 2020/0273423 A1* | 8/2020 | Okada | G09G 3/3655 |
| 2021/0097910 A1* | 4/2021 | Wang | G09G 3/3225 |

FOREIGN PATENT DOCUMENTS

| | | |
|---|---|---|
| JP | H04-215048 A | 8/1992 |
| JP | H09-243979 A | 9/1997 |
| JP | 2016-066046 A | 4/2016 |
| KR | 2014-0049130 A | 4/2014 |

* cited by examiner

Primary Examiner — Thang X Le
(74) Attorney, Agent, or Firm — Oliff PLC

(57) ABSTRACT

A liquid crystal device includes a common electrode as a first electrode, a pixel electrode as a second electrode, a liquid crystal layer to which a drive voltage is applied for one refresh period as a first refresh period, and a measurement circuit that applies an inspection voltage to the liquid crystal layer between the common electrode and the pixel electrode, sets a period that is longer than one refresh period after the application of the inspection voltage is stopped, and measures a voltage between the common electrode and the pixel electrode.

15 Claims, 12 Drawing Sheets

LIQUID CRYSTAL DEVICE, ELECTRONIC APPARATUS, AND PHYSICAL PROPERTY MEASUREMENT METHOD FOR LIQUID CRYSTAL LAYER

The present application is based on, and claims priority from JP Application Serial Number 2021-160804, filed Sep. 30, 2021, the disclosure of which is hereby incorporated by reference herein in its entirety.

BACKGROUND

1. Technical Field

The present disclosure relates to a liquid crystal device, an electronic apparatus provided with the liquid crystal device, and a physical property measurement method for a liquid crystal layer used in the liquid crystal device.

2. Related Art

Liquid crystals used in a liquid crystal device deteriorate due to DC voltage components applied for a long period of time. Furthermore, when a liquid crystal device is used as a light valve of a projector, the liquid crystal deteriorates even due to high-intensity light incidence and a chemical action caused by heat. Deterioration of liquid crystals is, for example, a phenomenon in which the amount of mobile ions including anions and cations increases in the liquid crystals, and thus the insulating properties of the liquid crystals are degraded. The deterioration in the insulating properties appears, for example, as a decrease in a voltage retention rate of the liquid crystals, and is visually recognized on the liquid crystal panel as display defects such as stains or irregularities. JP-A-4-215048 discloses a method for evaluating acceleration of such a deterioration phenomenon of liquid crystals. In this method, a pair of deterioration evaluation electrodes are provided outside a display region of a liquid crystal panel, and after a 100-hour acceleration test is performed on the liquid crystal panel, a 5 V voltage is applied between the deterioration evaluation electrodes for 50 μseconds, and then the voltage retention rate after 16.7 milliseconds is measured to evaluate deterioration of the liquid crystal.

According to research conducted by the present applicants, for example, when a liquid crystal panel was used to perform an acceleration test involving high-intensity light incidence, it was ascertained that there were a stage in which mobile ions included in the liquid crystal relatively gently increased and then a stage in which the mobile ions included in the liquid crystal rapidly increased. In addition, for example, when UV light other than visible light was incident on the liquid crystal panel, the chemical action was intensified due to the high energy of the UV light, and deterioration of the liquid crystal quickly progressed.

In addition, when the amount of mobile ions included in the liquid crystal is remarkable, the occurrence of a problem such as a decrease in the display quality of the liquid crystal panel is unavoidable, and thus there is a desire to know when the end of life of the liquid crystal panel is near before it reaches the end of life from the perspective of preventive maintenance.

However, the method of JP-A-4-215048 has a problem that it is difficult to carry out preventive maintenance. Specifically, according to verification results provided by the present applicants, using the method of JP-A-4-215048, it is difficult to observe the situation where the mobile ions gradually increase in the stage in which the mobile ions included in the liquid crystal relatively gently increase.

SUMMARY

A liquid crystal device includes a first electrode, a second electrode, a liquid crystal layer to which a drive voltage is applied in each first refresh period, and a measurement circuit that applies an inspection voltage to the liquid crystal layer between the first electrode and the second electrode, and measures a potential of the first electrode after a period that is longer than the first refresh period elapses after the application of the inspection voltage is stopped.

A liquid crystal device includes a first electrode, a second electrode, a liquid crystal layer to which a drive voltage that is equal to or higher than a threshold voltage is applied, and a measurement circuit that applies an inspection voltage that is lower than or equal to the threshold voltage of the liquid crystal layer and higher than 0 V as a voltage to be applied to the liquid crystal layer between the first electrode and the second electrode and measures a potential of the first electrode after the application of the inspection voltage is stopped.

An electronic apparatus includes the liquid crystal device.

A physical property measurement method for a liquid crystal layer in a liquid crystal device that includes the liquid crystal layer and applies a drive voltage to the liquid crystal layer in each first refresh period includes applying an inspection voltage to the liquid crystal layer between the first electrode and the second electrode that are disposed to apply an electric field to the liquid crystal layer, and measuring a potential of the first electrode after a period that is longer than the first refresh period elapses after the application of the inspection voltage is stopped.

A physical property measurement method for a liquid crystal layer of a liquid crystal device that applies a drive voltage that is equal to or higher than a threshold voltage of the liquid crystal layer includes applying an inspection voltage that is lower than or equal to the threshold voltage and higher than 0 V to the liquid crystal layer between a first electrode and a second electrode that are disposed to apply an electric field to the liquid crystal layer, and detecting a potential of the first electrode after the application of the inspection voltage is stopped.

DESCRIPTION OF EXEMPLARY EMBODIMENTS

Exemplary embodiments of the present disclosure will be described below with reference to the accompanying drawings. Here, in each of the drawings below, the scale of each member may differ from the actual scale in order for it to have a recognizable size. In addition, in each of the drawings below, X, Y, and Z axes are provided, as necessary, as coordinate axes orthogonal to each other, and in each drawing, a direction indicated by an arrow along each of these axes is referred to as a positive direction, and a direction opposite to the positive direction is referred to as a negative direction.

Further, the positive Z direction may also be referred to as an upward direction, the negative Z direction may be referred to as a downward direction, and a view from the positive Z direction is called a plan view or a planar view. Further, in the following description, with respect to a substrate, the description "an element on the substrate", for example, represents either a case in which the element is disposed on and in contact with the substrate, a case in which the element is disposed on the substrate via another structure, or a case in which a part of the element is disposed on and in contact with the substrate and anther part thereof is disposed via another structure.

1. First Embodiment 1.1. Overview of Liquid Crystal Panel

Figure 1:
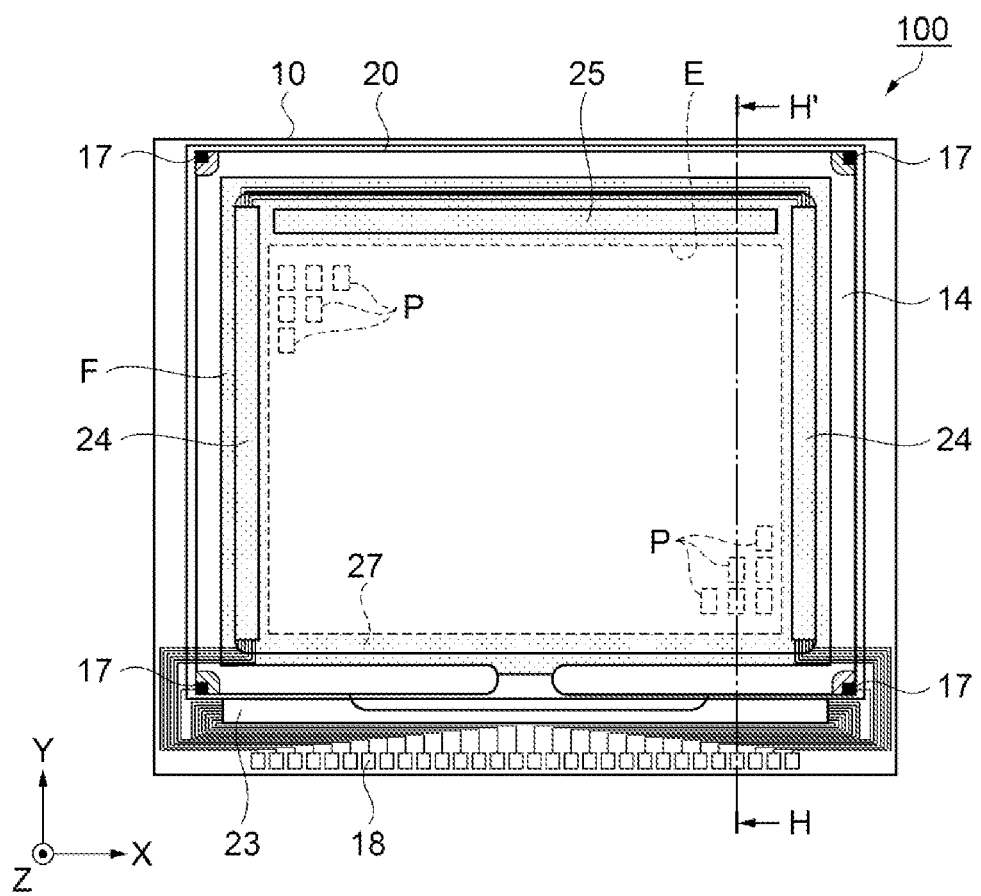
FIG. 1 is a plan view illustrating a schematic configuration of a liquid crystal panel used in a liquid crystal device according to a first embodiment.

FIG. 1 is a plan view illustrating a schematic configuration of a liquid crystal panel used in a liquid crystal device according to a first embodiment. Further, in the first embodiment, an active drive-type liquid crystal device 100 including thin film transistors (TFTs) serving as switching elements for each pixel will be described as an example of a liquid crystal panel 100. The liquid crystal panel 100 is combined with a measurement circuit for measuring physical properties of a drive integrated circuit (IC) and the liquid crystal layer described below to configure a liquid crystal device, and can be suitably used as a light modulating device in a projection-type display device as an electronic apparatus or the like.

The liquid crystal panel 100 includes an element substrate 10 and a counter substrate 20. Further, all configurations described in the solid line inside the outline of the counter substrate 20 are configurations arranged between the counter substrate 20 and the element substrate 10.

A sealing material 14 is provided in a frame shape along the outer edge of the counter substrate 20. A partition 27 indicated by the halftone dots is formed of a light-shielding film, and arranged to surround a display region E along the outer edge of the display region E on the inner side of the sealing material 14. The sealing material 14 is an adhesive made of a photocurable resin, a thermosetting resin, or the like, containing a gap material such as glass fibers or glass beads arranged to set the gap between the element substrate 10 and the counter substrate 20 to have a predetermined value.

In the display region E, pixels P are disposed in a matrix shape. Peripheral circuits such as a scanning line drive circuit 24 and a pre-charge circuit 25 are disposed in the peripheral region F between the display region E and the sealing material 14. In addition, a data line drive circuit 23 and a plurality of external connection terminals 18 are disposed in a portion of the element substrate 10 on the outer side of the sealing material 14 in the drawing that protrudes from the counter substrate 20 in the negative Y direction at the lower side of the drawing.

The inter-substrate conduction parts 17 are disposed to correspond to the four corners of the counter substrate 20, in order to acquire electrical continuity between the element substrate 10 and the counter substrate 20.

1.2. Overview of Cross-Sectional Configuration of Liquid Crystal Panel

Figure 2:
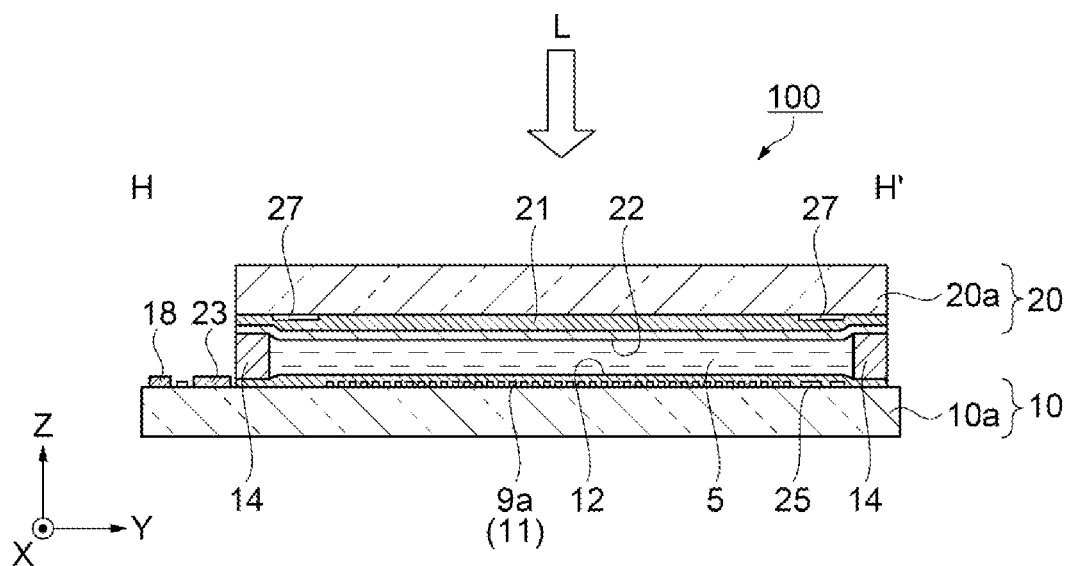
FIG. 2 is a cross-sectional view along line H-H' of FIG. 1.

FIG. 2 is a cross-sectional view illustrating a schematic structure of the liquid crystal panel along line H-H' of FIG. 1. The element substrate 10 and the counter substrate 20 are disposed via the sealing material 14, and a liquid crystal layer 5 is disposed between the element substrate 10 and the counter substrate 20.

The element substrate 10 includes a pixel electrode 9a having light transmissivity provided for each pixel P, a TFT 11 serving as a pixel switching element disposed to correspond to the pixel electrode 9a, and a first alignment film 12 disposed to cover the pixel electrode 9a between a substrate 10a of the element substrate and the liquid crystal layer 5.

The counter substrate 20 is provided with the partitions 27, a common electrode 21, and a second alignment film 22 disposed to cover the common electrode 21 between a substrate 20a of the counter substrate and the liquid crystal layer 5.

The partition 27 is provided at a position planarly overlapping the scanning line drive circuit 24. The partition 27 has the role of blocking light L incident from a laser light source, which is not illustrated, on the counter substrate 20 side not to be incident on the peripheral circuits including the scanning line drive circuit 24 to prevent the peripheral circuits from malfunctioning due to the light L.

The pixel electrode 9a and the common electrode 21 are formed of a transparent conductive material, for example, indium tin oxide (ITO), or the like. The substrate 10a and the substrate 20a are substrates having translucency, and for example, a glass substrate or a quartz substrate is used. The first alignment film 12 and the second alignment film 22 are formed of an inorganic material such as silicon oxide. The liquid crystal layer 5 is formed of a liquid crystal having negative dielectric anisotropy, for example.

1.3. Overview of Configuration of Liquid Crystal Device

Figure 3:
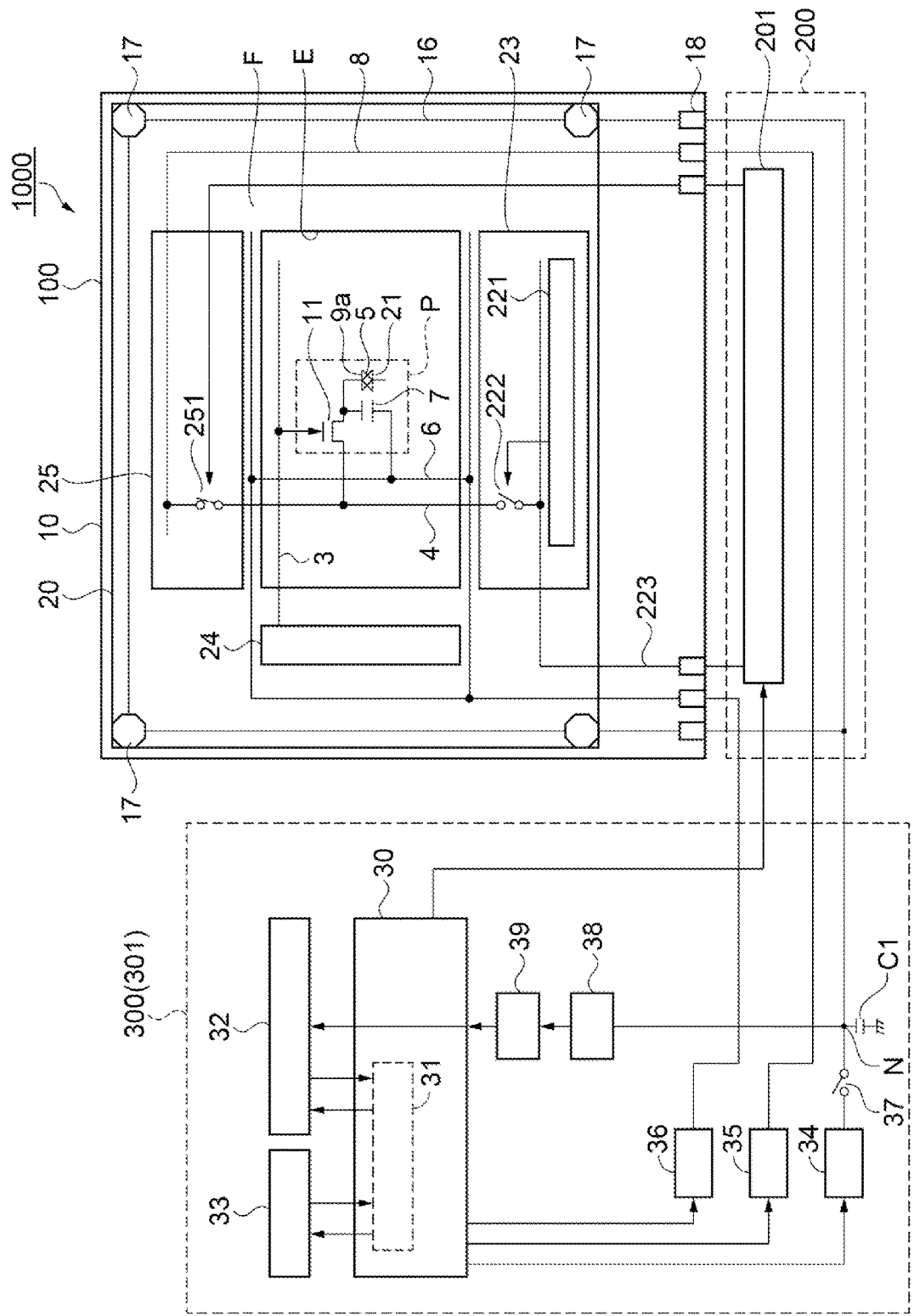
FIG. 3 is an explanatory view illustrating a schematic configuration of the liquid crystal panel of FIG. 1.

FIG. 3 is an explanatory view illustrating a schematic configuration of a liquid crystal device. A liquid crystal device 1000 includes a liquid crystal panel 100, a control substrate 200 in which a drive IC 201 is mounted, and a measurement substrate 300 in which a measurement circuit 301 is mounted. The control substrate 200 is, for example, a flexible printed circuit (FPC) substrate, and is electrically connected to an external connection terminal 18 of the liquid crystal panel 100. In addition, the control substrate 200 is electrically connected to the measurement substrate 300 via a connector which is not illustrated. Alternatively, the control substrate 200 and the measurement substrate 300 may be integrally formed, and may be electrically connected to the external connection terminal 18 of the liquid crystal panel 100 using a separate FPC substrate.

The liquid crystal panel 100 includes a plurality of scanning lines 3 and a plurality of signal lines 4 intersecting the plurality of scanning lines 3 in a display region E, and has a pixel P at the position corresponding to the intersection of each scanning line 3 and each signal line 4.

The pixel P includes a pixel electrode 9a, a TFT 11 that controls electrical connecting between the signal line 4 and the pixel electrode 9a, a retention capacitor 7 having one end electrically connected to the pixel electrode 9a and the other end electrically connected to a capacitance line 6, and a liquid crystal layer 5 disposed between the pixel electrode 9a and the common electrode 21.

In a peripheral region F, a scanning line drive circuit 24, a data line drive circuit 23, a pre-charge circuit 25, and inter-substrate conduction parts 17 are disposed. The scanning line drive circuit 24 supplies scanning signals to the scanning lines 3 to control on and off states of the TFT 11.

The data line drive circuit 23 includes a sample switch 222 that controls electrical connecting between an image signal supply line 223 and the signal lines 4, and a shift register 221 that supplies a control signal for controlling an on/off state of the sample switch 222. In this embodiment, the data line drive circuit 23 supplies an image signal to each pixel electrode 9a using a phase expansion drive method for collectively selecting the sample switch 222 electrically connected to a predetermined number of adjacent signal lines 4.

The pre-charge circuit 25 supplies a pre-charge voltage supplied from a reference potential generation circuit 35 that also serves as a pre-charge voltage generation unit to the signal line 4 via a pre-charge signal line 8. A pre-charge switch 251 controls electrical connecting between the pre-charge signal line 8 and the signal line 4 based on a control signal supplied from the drive IC 201.

The inter-substrate conduction parts 17 are disposed to correspond to the four corners of a counter substrate 20, and are electrically connected to each other via a common potential line 16. The common potential line 16 is electrically connected to a node N of the measurement substrate 300 via the external connection terminal 18. The node N is a wiring line electrically connected to the common electrode 21. A stabilizing capacitor C1 is preferably provided in the node N to stabilize a measurement voltage.

The measurement circuit 301 is mounted in the measurement substrate 300. The measurement circuit 301 includes a central control circuit 30, a measurement value storage circuit 32, a determination circuit 31, a display information generation circuit 33, an inspection voltage generation circuit 34, a reference potential generation circuit 35, a capacitance line voltage generation circuit 36, an amplifying circuit 38, and an A/D converter 39.

The central control circuit 30 controls each circuit included in the measurement circuit 301 when a deterioration state of the liquid crystal layer 5 of the liquid crystal panel 100 is measured. The measurement value storage circuit 32 stores measured measurement values. The determination circuit 31 determines a deterioration state of the liquid crystal layer 5 based on a measurement value stored in the measurement value storage circuit 32. The display information generation circuit 33 generates display information based on the measurement value and the determination result. The inspection voltage generation circuit 34 outputs an inspection voltage V1 to the node N via a switch 37 at the time of measurement. The switch 37 is controlled by the central control circuit 30. The reference potential generation circuit 35 outputs a reference potential V2 as a reference for the inspection voltage V1 to be applied to the pixel electrode 9a at the time of measurement. The amplifying circuit 38 includes, for example, a voltage follower, and outputs the potential of the node N as a measurement voltage at the time of measurement. The A/D converter 39 performs A/D conversion on the measurement voltage output from the amplifying circuit 38 to convert it into a digital measurement value, and outputs the measurement value to the measurement value storage circuit 32 via the central control circuit 30.

Note that each circuit constituting the measurement circuit 301 may be configured such that some or all functions realized by the circuit are realized with, for example, a control program of the central control circuit 30. In addition, the measurement circuit 301 may be configured as one IC or divided into a plurality of ICs and stored.

In addition, each circuit may be configured to perform a plurality of functions. For example, the inspection voltage generation circuit 34 may function as a common potential generation circuit that outputs a common potential to the common electrode 21 during normal driving. In addition, the reference potential generation circuit 35 may function as a pre-charge voltage generation circuit that applies a pre-charge voltage to the signal lines 4 during normal driving. The capacitance line voltage generation circuit 36 applies a retention capacitor potential V3 to the capacitance line 6.

The measurement substrate 300 is electrically connected to the liquid crystal panel 100 via the control substrate 200. Further, the measurement circuit 301 can be mounted in the control substrate 200.

The drive IC 201 is mounted in the control substrate 200. The drive IC 201 outputs a timing signal, an image signal, a control signal, and the like to the peripheral circuits such as the data line drive circuit 23, the scanning line drive circuit 24, and the pre-charge circuit 25. The control substrate 200 includes, for example, an FPC substrate, and one end terminal is electrically connected to the external connection terminal 18 of the liquid crystal panel 100.

Figure 4:
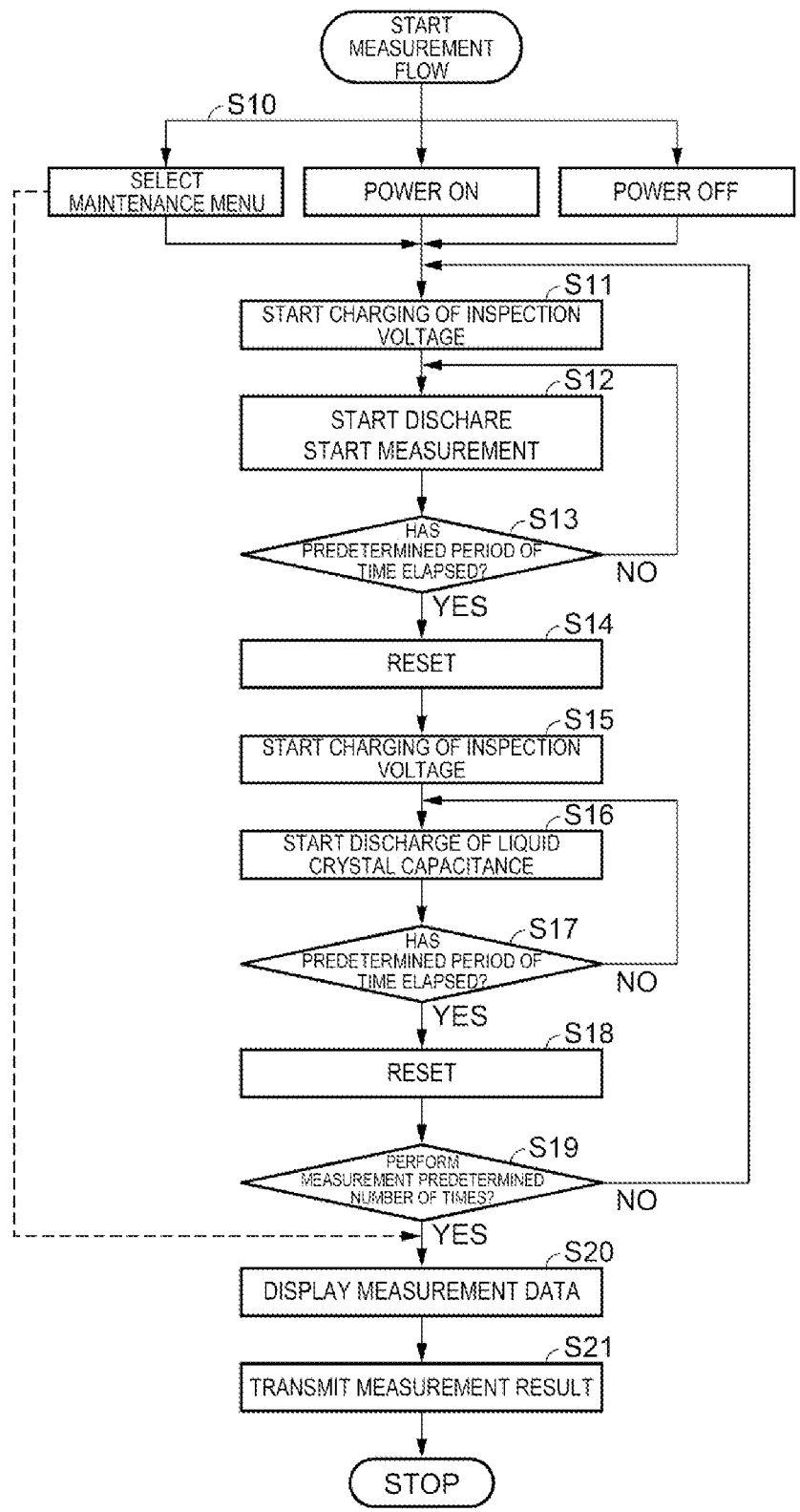
FIG. 4 is a flowchart showing a measurement method for a liquid crystal device.
Figure 5:
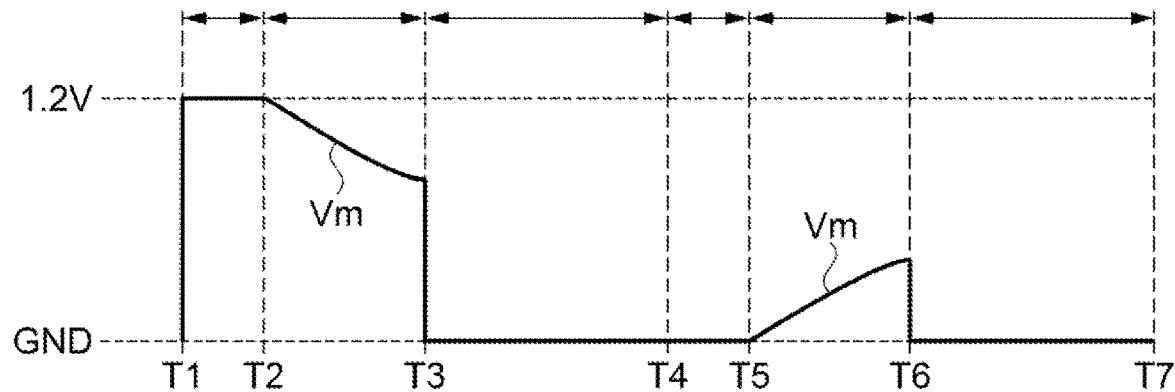
FIG. 5 is a timing chart showing the measurement method for the liquid crystal device.

1.4. Overview of Physical Property Measurement Method for Liquid Crystal Layer FIG. 4 is a schematic flowchart showing a physical property measurement method for a liquid crystal layer of a liquid crystal panel, and FIG. 5 is a timing chart showing a temporal change in the potential of a measurement target node during execution of the physical property measurement method for the liquid crystal layer.

The physical property measurement method for the liquid crystal layer 5 will be described mainly referring to the flowchart of FIG. 4 and appropriately switching to FIGS. 3 and 5.

In step S10, when a predetermined event occurs, the liquid crystal device 1000 transitions from a normal drive mode to a measurement mode to start measuring physical properties of the liquid crystal layer 5. Here, examples of the predetermined event include power-on and power-off of a projection-type display device using the liquid crystal device 1000, a measurement instruction from a maintenance menu selection in a projection-type display device using the liquid crystal device 1000, and the like, and the occurrence of such an event triggers a measurement start command transmitted from a projection-type display device. Upon receiving the measurement start command from the projection-type display device, the central control circuit 30 starts measuring physical properties of the liquid crystal layer 5. Further, step S10 shows the concept of a measurement mode transition event. In practice, for example, an instruction from the maintenance menu selection is for interrupt processing, and the projection-type display device using the liquid crystal device 1000 is powered on. In addition, the measurement mode transition event does not enforce all of the illustrated "maintenance menu selection", "power on", and "power off". In addition, according to an aspect of the present disclosure, the physical property measurement for the liquid crystal layer 5 is performed, for example, in a state in which the light source of the projection-type display device is unlit. Alternatively, a configuration in which light from the light source is blocked by a mechanical light blocking mechanism may be implemented. This is because the inspection electrode and the reference electrode provided in the liquid crystal panel 100 are designed to be subject to electrical control that is differentiated from that in one refresh period of the liquid crystal panel 100. Details of the control over the inspection electrode and the reference electrode will be described later. If the light source of the projection-type display device is in an unlit state, no display problem occurs in the projection-type display device.

In step S11, a liquid crystal capacitor composed of the common electrode 21 and the plurality of pixel electrodes 9a and the liquid crystal layer 5 is charged with the inspection voltage V1. The inspection voltage generation circuit 34 starts outputting the inspection voltage V1, and the reference potential generation circuit 35 starts outputting the reference potential V2 as a reference of the inspection voltage V1. The switch 37 is controlled such that it is in an ON state from a time T1 to a time T2 in FIG. 5. Thus, the inspection voltage V1 output from the inspection voltage generation circuit 34 is applied to the common electrode 21 via the node N, the common potential line 16 serving as the inspection electrode, and the inter-substrate conduction parts 17.

Here, the absolute value of the voltage applied to the liquid crystal layer 5, that is, |V1−V2|, is a voltage lower than or equal to a threshold voltage of the liquid crystal layer 5 and higher than or equal to 0 V. In this embodiment, the threshold voltage of the liquid crystal layer 5 is approximately 2.2 V, and for the inspection voltage V1, 1.2 V is adopted. Further, the threshold voltage of the liquid crystal layer 5 is a drive voltage at which a transmittance or brightness of the liquid crystal layer 5 is approximately 10% with respect to its maximum gradation ratio, and more preferably, the voltage immediately before the liquid crystal molecules starts moving, or the voltage immediately before the alignment state of the liquid crystal molecules changes. In the present example, the threshold voltage of the liquid crystal layer 5 as described above is defined because the normally black-type liquid crystal panel 100 is used. When a normally white-type liquid crystal panel 100 is used, for example, the threshold voltage of the liquid crystal layer 5 can be defined as a drive voltage at which a transmittance or brightness of the liquid crystal layer 5 is approximately 90% with respect to the maximum gradation ratio. In any event, when the inspection voltage V1 is set based on the threshold voltage of the liquid crystal layer 5, the effect of improving the measurement sensitivity in physical property measurement for the liquid crystal layer 5 will be exhibited as described below.

The reference potential V2 output from the reference potential generation circuit 35 is supplied to the pre-charge circuit 25 via the pre-charge signal line 8. At the time T1 of FIG. 5, the pre-charge switch 251 connected to all of the signal lines 4 is controlled such that it shifts from an OFF state to an ON state. In addition, at the same time, a scanning signal is output to all of the scanning lines 3, and the TFTs 11 of all of the pixels P enter an ON state. This operation causes all of the pixels P to be in a selected state, and the reference potential V2 is applied to the pixel electrodes 9a of all of the pixels P. Here, the reference potential V2 is GND, and the pixel electrodes 9a to which the reference potential V2 is applied are reference electrodes. Further, the state in which all of the pixels P are selected continues until the physical property measurement for the liquid crystal layer 5 ends.

In this way, from the time T1 to the time T2 of FIG. 5, the liquid crystal capacitance including the common electrode 21, the plurality of pixel electrodes 9a, and the liquid crystal layer 5 is charged with the positive inspection voltage |V1−V2|=|V1−GND|=V1 of 1.2 V with reference to the potential of the pixel electrodes 9a.

In step S12, the switch 37 is controlled such that it is in an off state at the time T2 of FIG. 5. This causes discharging of the liquid crystal capacitance including the common electrode 21 and the plurality of pixel electrodes 9a to be started, and the measurement circuit 301 starts observing the discharge of the liquid crystal capacitance. Further, the observation of the discharge of the liquid crystal capacitance is performed by measuring the voltage of the node N as potential of the common electrode 21 serving as an inspection electrode. Further, for convenience of explanation, the voltage of the node N is described as the same as the potential of the common electrode 21.

The measurement circuit 301 converts the voltage of the node N into a digital value using the AD converter 39 via the amplifying circuit 38 electrically connected to the node N, and stores the digital value in the measurement value storage circuit 32 as a measurement value Vm. In this manner, the voltage of the node N stored in the measurement value storage circuit 32 may be described as a voltage Vm, a measurement value Vm, or a measurement value.

In step S13, it is determined whether a predetermined period of time has elapsed from the time T2. The observation of the discharge of the liquid crystal capacitance by the measurement circuit 301 is continued until a predetermined period of time elapses from the time T2. Here, the predetermined period of time is a period of time that is longer than the time corresponding to one refresh period of the liquid crystal panel 100, and for example, is approximately 150 ms in this embodiment. The predetermined period of time is not limited thereto, and may be, for example, 200 ms. Alternatively, in view of the control properties of the liquid crystal panel 100, a period corresponding to one refresh period×N (N is an integer of 2 or more) may be set, for example.

When the predetermined period of time elapses from the time T2 of FIG. 5 and it is a time T3 (S13_Yes), the process proceeds to step S14. When the predetermined period of time has not elapsed (S13_No), the process returns to step S12. In step S14, the measurement circuit 301 resets the potential of the common electrode 21 and the plurality of pixel electrodes 9a to the GND at the same potential from the time T3 to a time T4. That is, the output of the inspection voltage V1 of the inspection voltage generation circuit 34 is set to the GND according to an instruction from the central control circuit 30. In addition, the output of the reference potential V2 of the reference potential generation circuit 35 is set to the GND.

When it is the time T4 in FIG. 5, the process proceeds to step S15, and the measurement circuit 301 starts charging the liquid crystal capacitance again. In step S15, the reference potential generation circuit 35 supplies 1.2 V as the reference potential V2 to the plurality of pixel electrodes 9a, and the inspection voltage generation circuit 34 supplies the GND to the common electrode 21. In step S15, a negative inspection voltage V1 is applied to the common electrode 21 serving as the inspection electrode based on the potential of the plurality of pixel electrodes 9a, unlike in step S11. That is, −1.2 V is applied with a given polarity. Step S11 and step S15 are, in particular, a relationship of AC drive. This configuration suppresses direct current application in the physical property measurement of the liquid crystal layer 5.

When the switch 37 is controlled such that it enters the ON state from the time T4 to a time T5 of FIG. 5, the liquid crystal capacitance including the plurality of pixel electrodes 9a, the common electrode 21, and the liquid crystal layer 5 is charged with −1.2 V of the negative polarity inspection voltage V1 based on the potential of the plurality of pixel electrodes 9a.

At the time T5 of FIG. 5, the process proceeds to step S16. In step S16, the switch 37 is controlled such that it is in an OFF state at the time T5 of FIG. 5. This causes discharge of the liquid crystal capacitance including the common electrode 21 and the plurality of pixel electrodes 9a to be started, and the measurement circuit 301 starts observing the discharge of the liquid crystal capacitance. The observation of the discharge of the liquid crystal capacitance is performed by measuring the voltage of the node N as the potential of the common electrode 21, as in step S12. In addition, although the mode in which the measurement value is obtained from the discharge curve after the inspection electrode is positively charged with respect to the reference electrode is set in step S12 in the description of the embodiment, in step S16, a mode in which the measurement value is obtained from the discharge curve after the inspection electrode is negatively charged with respect to the reference electrode may be set.

In step S17, it is determined whether a predetermined period of time has elapsed from the time T5. When the predetermined period of time elapses from the time T5 of FIG. 5 and it is a time T6 (S17_Yes), the process proceeds to step S18. When the predetermined period of time has not elapsed (S17_No), the process returns to step S16. In step S18, the measurement circuit 301 resets the potential of the common electrode 21 and the plurality of pixel electrodes 9a to the GND at the same potential from the time T6 to a time T7. That is, the output of the inspection voltage V1 of the inspection voltage generation circuit 34 is set to the GND potential according to an instruction from the central control circuit 30. In addition, the output of the reference potential V2 of the reference potential generation circuit 35 is set to the GND potential.

In step S19, it is determined whether the flow from step S11 to step S18 has been repeated a predetermined number of times. If the central control circuit 30 has performed the measurement flow from step S11 to step S18 the predetermined number of times (S19_Yes), the process proceeds to step S20. If the central control circuit 30 has not performed the measurement flow the predetermined number of times (S19_No), the process returns to step S11. The predetermined number of times is 10 times, for example. By observing the course of the plurality of discharge operations to calculate the average value, the measurement value of the voltage of the node N can be stabilized. Of course, a measurement value of the discharging process with the same polarity is used to calculate the average value of the voltage of the node N. Further, a measurement value may be described as an average value obtained in this manner.

In step S20, the display information generation circuit 33 creates display data indicating a deterioration state of the liquid crystal layer 5 based on the measurement value of the voltage of the node N recorded in the measurement value storage circuit 32. In addition, during the normal drive of the liquid crystal panel 100, the central control circuit 30 displays the display data generated by the display information generation circuit 33 in the display region E of the liquid crystal panel 100 via the drive IC 201. Further, the deterioration state of the liquid crystal layer 5 may be displayed only when a notification to the user is needed such as when the end of life of the liquid crystal panel 100 is near and the measurement value of the voltage of the node N reaches a set threshold S1, or the like.

In addition, the display of the deterioration state of the liquid crystal layer 5 may be performed by a projection-type display device using the liquid crystal device 1000 as will be described below. For example, when the projection-type display device is a three-plate projection-type display device provided with three liquid crystal devices 1000 corresponding to R, G, and B, the liquid crystal devices 1000 do not individually display the deterioration states of the liquid crystal layers 5, but the projection-type display device may be configured to collectively display the deterioration states of the liquid crystal panels 100 of the three liquid crystal device 1000.

In step S21, the central control circuit 30 transmits data related to the measurement results to the projection-type display device using the liquid crystal device 1000. The projection-type display device performs necessary processing such as display processing based on data indicating the deterioration state of the liquid crystal layer 5. Note that the flow for transmission of the measurement results can be omitted depending on the specification of the projection-type display device using the liquid crystal device 1000.

The measurement results with respect to the deterioration state of the liquid crystal layer 5 can also be displayed from the maintenance menu of the projection-type display device using the liquid crystal device 1000. The maintenance menu is implemented, for example, as part of a setting menu for the projection-type display device. When the central control circuit 30 receives a display instruction command of the measurement results from the projection-type display device using the liquid crystal device 1000 in step S10, the process proceeds to step S20, and the measurement results are displayed in the display region E of the liquid crystal panel 100.

Figure 6A:
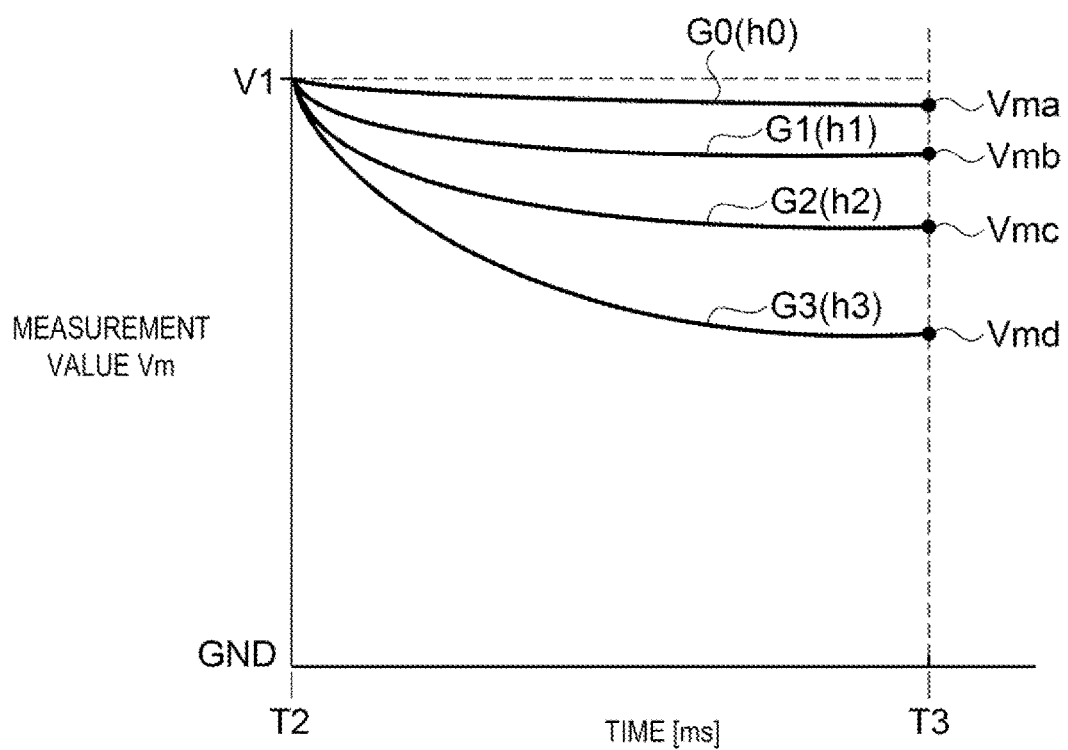
FIG. 6A is a graph showing a relationship between a usage time and discharge characteristics.

1.5. Overview of Relationship Between Usage Time and Discharge Characteristics of Liquid Crystal Panel FIG. 6A is a graph showing a relationship between a usage time and discharge characteristics of the liquid crystal panel. A usage time is, for example, a cumulative usage time. With respect to the projection-type display device, for example, a usage time corresponds to a cumulative lighting time. Specifically, discharge characteristics include the discharge curve observed in step S12, for example. The vertical axis indicates a measurement value Vm for a voltage of the node N. The horizontal axis indicates the time of the discharge of step S12, and a time T2 corresponds to the discharge start time T2 of FIG. 5 at which measurement starts, and a time T3 corresponds to the measurement end time T3 of FIG. 5. In this embodiment, the time T3 is a time that comes 150 ms after the time T2.

In FIG. 6A, the discharge curve G0 indicates the discharge curve of the liquid crystal capacitance of the liquid crystal panel 100 when use of the liquid crystal panel 100 starts, that is, at a usage time h0 at which the usage time is zero, and the discharge curve G3 indicates the discharge curve at a usage time h3 immediately before the liquid crystal panel 100 reaches the end of its life. The discharge curve G1 indicates the discharge curve at the time when the usage time h1 has elapsed from the start of use of the liquid crystal panel 100, and the discharge curve G2 indicates the discharge curve at the time when the usage time h2 has elapsed from the start of use of the liquid crystal panel 100. Here, the relationship of usage times is 0<h1<h2<h3.

Although the measurement value on each of the discharge curves at the discharge start time T2 is close to V1−V2=V1−GND=1.2 V, the measurement value at the discharge end time T3 varies. The measurement value Vma on the discharge curve G0 at the discharge end time T3 decreased by, for example, approximately 5% from the inspection voltage V1 at the discharge start time T2. In addition, in the same manner, the measurement value Vmb on the discharge curve G1 at the discharge end time T3 decreased by, for example, approximately 11%, the measurement value Vmc on the discharge curve G2 at the discharge end time T3 decreased by, for example, approximately 24%, and the measurement value Vmd on the discharge curve G3 at the discharge end time T3 decreased by, for example, approximately 44%.

Thus, the measurement values Vma, Vmb, Vmc, and Vmd at the discharge end time T3 vary for the usage times h0, h1, h2, and h3 of the liquid crystal panel 100. This is a result of an increase in the mobile ions in the liquid crystal layer 5 resulting from a chemical reaction caused by high-intensity light incidence and a change of the discharge curve according to the usage time of the liquid crystal panel 100. In addition, the measurement method of this embodiment helps determine the deterioration state of the liquid crystal layer 5 depending on the value of the measurement values Vma, Vmb, Vmc, and Vmd at the discharge end time T3.

Figure 6B:
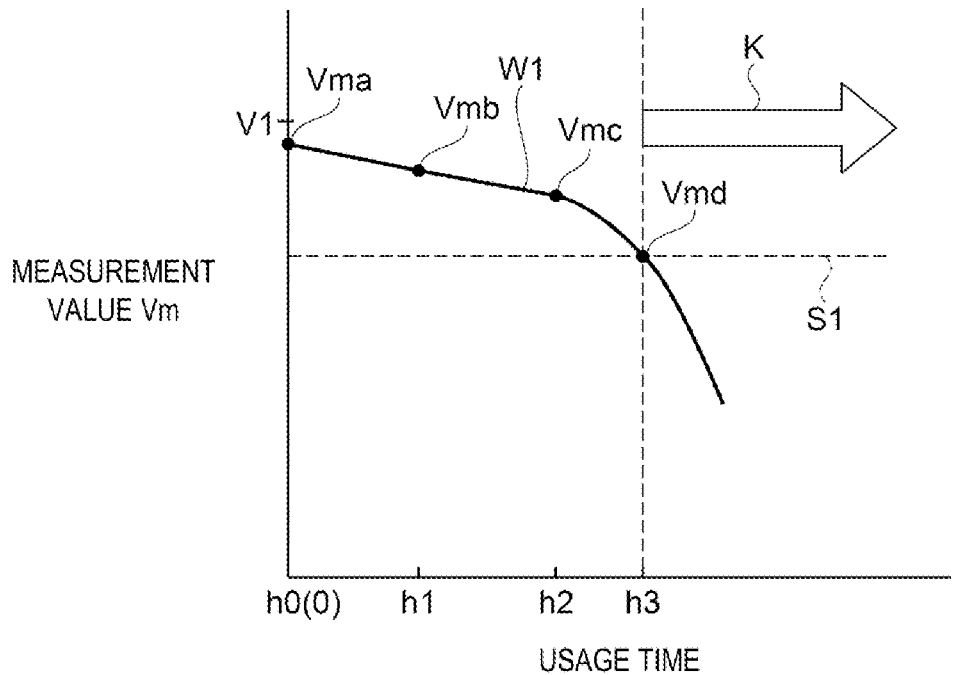
FIG. 6B is a graph showing a relationship between a usage time and a measurement value.

FIG. 6B is a graph showing a relationship between a usage time of the liquid crystal panel and a measurement value at the discharge end time. The vertical axis indicates a measurement value Vm at the discharge end time T3, and the horizontal axis indicates a usage time of the liquid crystal panel 100.

As shown in FIG. 6B, a transition line W1 of the measurement value Vm at the discharge end time T3 changes according to the lengths of the usage times h0, h1, h2, and h3 of the liquid crystal panel 100. Typically, the value indicated by the transition line W1 gradually decreases as a usage time increases. That is, the values of the measurement values Vma, Vmb, Vmc, and Vmd gradually decrease. In addition, a value indicated by the transition line W1 sharply decreases at a high rate from when the usage time h3 is about to pass, and when the usage time h3 passes over, the amount of mobile ions of the liquid crystal layer 5 suddenly increases, and the liquid crystal panel 100 reaches the end of its life. In this way, the transition line W1 changes non-linearly with respect to the usage time of the liquid crystal panel 100. In addition, it has been ascertained that, with respect to display quality, stains or irregularities seriously occur on the display screen from the time indicated by the arrow K after the usage time h3, the brightness decreases accordingly, and the display quality is degraded.

In this embodiment, the measurement value Vm at the discharge end time T3 that decreased to 70% of the inspection voltage V1 at the discharge start time T2 is set as a threshold S1. Then, a control program of the central control circuit 30 is set up so that, when the measurement value Vm is lower than the threshold S1, the user or the manager is reported the state indicating that the end of life of the liquid crystal panel 100 is near. Alternatively, as will be described below, the control program of the central control circuit 30 that can help ascertain the relationship between a usage time of the liquid crystal panel 100 until then and a measurement value Vm is also set up.

Further, the threshold S1 may be changed according to a situation in which the liquid crystal panel 100 is being used. For example, when higher display quality is required, or when it takes time for maintenance of the liquid crystal panel 100, the threshold S1 may be set to a measurement value Vmc corresponding to the usage time h2 to give a notification earlier.

1.6. Overview of Inspection Voltage and Measurement Time in Measuring Discharge Characteristics Next, the reason that a voltage lower than or equal to a threshold voltage of the liquid crystal layer 5 and equal to or higher than 0 V is used as the inspection voltage V1 as a discharge characteristic of the liquid crystal capacitance in this embodiment will be described with reference to FIGS. 7A and 7B.

Figure 7A:
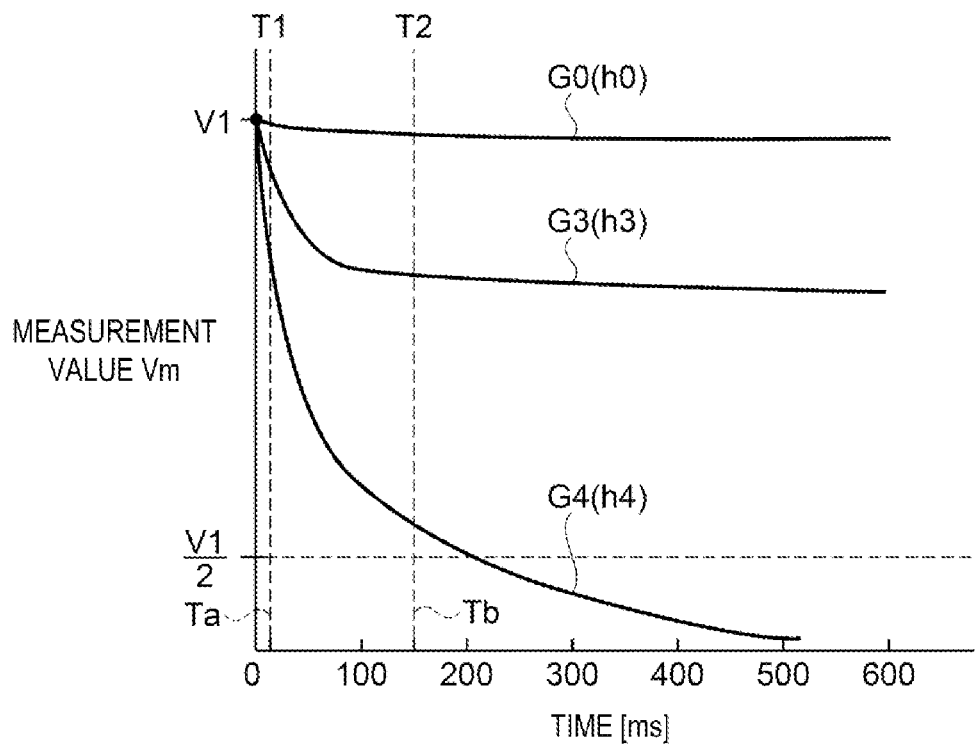
FIG. 7A is a graph showing discharge characteristics measured using an inspection voltage according to the first embodiment.
Figure 7B:
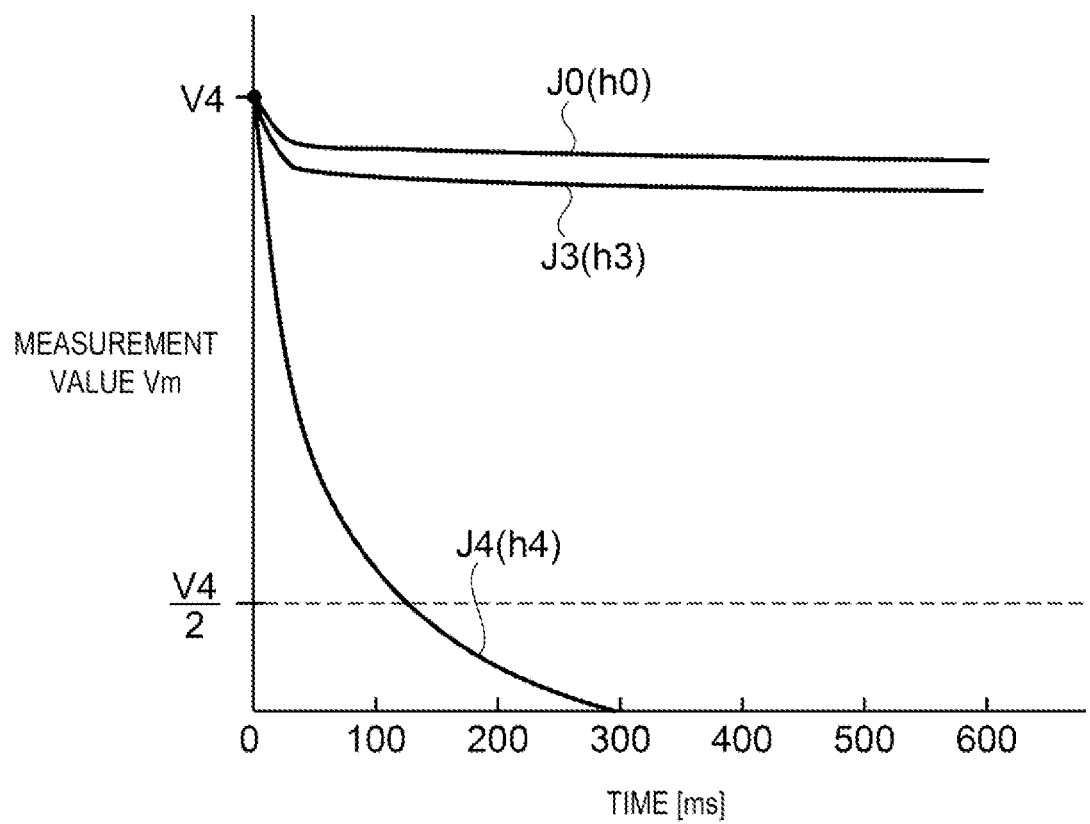
FIG. 7B is a graph showing discharge characteristics measured using an inspection voltage according to a comparative example.

FIG. 7A is a graph showing the discharge characteristics measured at the inspection voltage of this embodiment, and FIG. 7B is a graph showing the discharge characteristics measured at an inspection voltage of a comparative example.

Each discharge characteristic is represented by a discharge curve obtained in step S12. The vertical axis indicates potential of the common electrode 21 as the inspection electrode having the discharge characteristics of the liquid crystal capacitance, that is, the measurement value Vm of the voltage of the node N. Although the measurement value Vm is actually an output value of the A/D converter 39, it is converted into a voltage value and shown for the description, and the voltage range of about V1/2 to V1 in FIG. 7A is indicated for the voltage of the node N. In addition, in FIG. 7B, the voltage range of about V4/2 to V4 is shown. The horizontal axis indicates time from the start of discharge. The discharge start time is set to 0. Further, in this embodiment, the inspection voltage V1 is 1.2 V, and the inspection voltage V4 of the comparative example is 2.5 V that is greater than about 2.2 V that is the threshold voltage of the liquid crystal layer 5.

Discharge characteristics were acquired by manufacturing a simulated panel that imitates the liquid crystal panel 100. An ITO electrode corresponding to the display region E of the element substrate 10 was provided and a reference potential V2 was applied to the simulated panel. The peripheral circuit portion of the element substrate 10 was provided with a fixed potential line imitating the peripheral circuits of the liquid crystal panel 100. Thus, the common electrode 21 serving as the inspection electrode has a parasitic capacitance component with respect to the peripheral circuits. In addition, an accelerated light resistance test using the simulated panel was performed to evaluate the discharge characteristics of the simulated panel that would have different usage times.

In FIG. 7A, the discharge curve G0 indicates the discharge curve in a test time h0 at the start of the accelerated light resistance test. The discharge curve G3 indicates the discharge curve in a test time h3 during the accelerated light resistance test. The discharge curve G4 indicates the discharge curve in a test time h4 at the end of the accelerated light resistance test. In the test time h3 during the accelerated light resistance test, it is hard to recognize a significant visual change on the display of the simulated panel. On the other hand, in the test time h4 at the end of the accelerated light resistance test, a significant stain (blacking) is recognized on the display of the simulated panel.

In FIG. 7A, although the discharge curve G0 little decreased from the inspection voltage V1 600 ms after the start of discharge, the discharge curve G3 decreased by about 20% 600 ms after the start of discharge, and the discharge curve G4 decreased by over 60% That is, the difference between the discharge curve G0 and the discharge curve G3 before the liquid crystal reaches the end of life is greater by about 20%, and this difference enables the discharge curve G0 clearly distinguished from the discharge curve G3. Thus, if we replace the simulated panel with the liquid crystal panel 100 for thinking, a change in the discharge curve until a display defect is found, that is, the history of change in the measurement value Vm, can be recorded as a significant difference.

On the other hand, in FIG. 7B according to the comparative example, the discharge curve J0 decreased by approximately 8% from the inspection voltage V4 600 ms after the start of discharge, the discharge curve J3 decreased by about 10% 600 ms after the start of discharge, and the discharge curve J4 decreased by over 60%.

In other words, the difference between the discharge curve J0 and the discharge curve J3 before the liquid crystal panel 100 reaches the end of life is extremely small, about 2% and monitoring a deterioration state of the liquid crystal layer 5 is difficult. In order to distinguish and measure the difference, a highly accurate measurement circuit is needed. Thus, because such a highly accurate measurement circuit is expensive and requires a large circuit configuration and area, it is difficult to mount the measurement circuit in products.

In the comparative example, the reason that the difference between the discharge curve J0 and the discharge curve J3 is small when a voltage exceeding the threshold voltage is set as the inspection voltage V4 can be understood as that the mobile ions move from one electrode, for example, the pixel electrode 9a, to the other electrode, for example, the common electrode 21 during the charging of step S11 due to the high inspection voltage V4, and the amount of mobile ions acting after the start of discharge is reduced. In addition, if the inspection voltage V4 exceeds the threshold voltage of the liquid crystal layer 5, the impact caused by the movement of the liquid crystal molecules of the liquid crystal layer 5, that is, a change in the liquid crystal capacitance caused by a change in the permittivity of the liquid crystal, would occur. As a result, it can be understood that the change in the discharge curve caused by the action of the mobile ions is not visible.

On the other hand, as in this embodiment, the reason that the discharge curve G0 and the discharge curve G3 can be clearly determined when a voltage lower than or equal to a threshold voltage and equal to or higher than 0 V is set as the inspection voltage V1 can be understood as the result that the amount of mobile ions moving from one electrode (e.g., the pixel electrode) to the other electrode (e.g., the counter electrode) at the charging of step S11 is reduced and the amount of mobile ion moving after the start of discharge is increased due to the low inspection voltage V1. In addition, because the inspection voltage V1 is lower than the threshold voltage of the liquid crystal layer 5, the impact caused by the movement of the liquid crystal molecules of the liquid crystal layer 5, that is, a change in the liquid crystal capacitance caused by a change in the permittivity of the liquid crystal, would not be received. Therefore, it is possible to understand that the action of the mobile ions can be observed as being effectively reflected.

Next, the reason that a deterioration state of the liquid crystal layer 5 is determined based on a measurement value after a predetermined period of time elapses from the discharge start time using the measurement method of this embodiment will be described with reference to FIG. 7A. Further, the predetermined period of time is a period of time that is longer than the time corresponding to one refresh period of the liquid crystal panel 100, and for example, is approximately 150 ms in this embodiment.

In FIG. 7A, a time Ta is a time corresponding to one refresh period of the liquid crystal panel 100. For example, when a frame rate of a video signal of a content video displayed by the liquid crystal device 1000 is 60 frame per seconds (fps), the refresh rate of the liquid crystal panel 100 is set to one from 60 fps to 120 fps, for example. In addition, when the refresh rate of the liquid crystal panel 100 is 60 fps, one refresh period is approximately 16.7 ms, and thus the time Ta corresponds to a time 16.7 ms after the start of discharge. A time Tb is longer than one refresh period, and corresponds to a time 150 ms after the start of discharge, for example.

In FIG. 7A, focusing on the transitions of the discharge curve G3, they are largely divided into two stages. That is, they include a first stage in which the measurement value sharply decreases from the discharge start time to over the time Ta (16.7 ms) and to around 90 ms and a second stage in which the measurement value gradually decreases after that.

From this point, it can be seen that, if the potential of the common electrode 21 is measured as the measurement value Vm after a period of time longer than one refresh period elapses after the start of discharge, the measurement value Vm at which the deterioration state of the liquid crystal layer 5 is determined can be obtained before the mobile ions sharply increase before the liquid crystal panel 100 reaches the end of life.

Further, it is conceivable that the reason for indicating such discharge curves is that mobile ions act in the first stage and leakage caused by a specific resistance of the bulk liquid crystal and the measurement circuit system acts in the second stage. Because the inspection voltage V1 is reduced as described above, it takes time to move the mobile ions. Thus, by providing a predetermined period of time that is longer than one refresh period from the start of discharge, it is possible to effectively reflect the action of the movement of the mobile ions to the measurement value Vm to determine the deterioration state of the liquid crystal layer 5. Typically, in the initial stage of deterioration of the liquid crystal layer 5, the liquid crystal layer 5 has a sufficient voltage holding capability in one refresh period. For this reason, it is very difficult to find a clear difference when observing the discharge curves for one refresh period.

According to the liquid crystal device 1000 of this embodiment as described above, the following effects can be obtained.

The liquid crystal device 1000 includes the common electrode 21 as a first electrode, the pixel electrode 9a as a second electrode, the liquid crystal layer 5 to which a drive voltage is applied for each refresh period as a first refresh period, and the measurement circuit 301 that applies the inspection voltage V1 between the common electrode 21 and the pixel electrode 9a and measures a potential Vm of the common electrode 21 after a period of time that is longer than one refresh period elapses, for example, 150 ms elapses, from a stop of the application of the inspection voltage V1.

In this manner, the liquid crystal device 1000 of this embodiment measures the potential Vm of the common electrode 21 after the period Tb that is longer than one refresh period elapses, for example, after 150 ms elapses after the application of the inspection voltage V1 is stopped.

Accordingly, the time in which the mobile ions can move between the common electrode 21 and the pixel electrode 9a is ensured due to the elapse of the period of time that is longer than one refresh period. As a result, a change in the discharge curve in accordance with the amount of mobile ions of the liquid crystal layer 5 is efficiently made, and a change in the amount of mobile ions caused by deterioration of the liquid crystal layer 5 can be accurately observed due to the value of the measurement value Vm.

The measurement circuit 301 applies, as the inspection voltage V1, a voltage that is lower than or equal to the threshold voltage of the liquid crystal layer 5 and higher than 0 V to the liquid crystal device 1000. Because the inspection voltage V1 is low, the amount of mobile ion moving in the charging period before the start of measurement of the discharge curve is reduced. Furthermore, the measurement value Vm is not affected by the change in the liquid crystal capacitance due to the influence of moving liquid crystal molecules, that is, a change in the permittivity of the liquid crystal, and thus the amount of mobile ions contained in the liquid crystal layer 5 can be accurately observed.

For the liquid crystal device 1000, the threshold voltage of the liquid crystal layer 5 is about 2.2 V. If a current when a voltage of a triangle wave is applied to the liquid crystal layer 5 is examined through electrical measurement, a current from the mobile ions is distributed when a voltage of higher than 0 V to a voltage around 1.5 V is applied to the liquid crystal layer 5. In addition, this current increases with deterioration of the liquid crystal layer 5.

Thus, if the threshold voltage of the liquid crystal layer 5 is approximately 2.2 V, it is possible to obtain a discharge curve reflecting the action of the mobile ions while avoiding the influence of the dielectric anisotropy of the liquid crystal. For this reason, a voltage that is lower than or equal to the threshold voltage of the liquid crystal layer 5 and higher than 0 V is applied as the inspection voltage V1.

In addition, in the above-described electrical measurement, the current peak due to the mobile ions is found near 0.5 V. Accordingly, a voltage that is lower than or equal to the threshold voltage of the liquid crystal layer 5 and equal to or higher than 0.5 V is preferably applied as the inspection voltage V1. In this way, it is possible to obtain a discharge curve efficiently reflecting the amount of mobile ions.

The liquid crystal device 1000 includes the common electrode 21 as a first electrode, the pixel electrode 9a as a second electrode, the liquid crystal layer 5 to which a drive voltage that is equal to or higher than the threshold voltage is applied, and the measurement circuit 301 that applies the inspection voltage V1 that is lower than or equal to the threshold voltage of the liquid crystal layer 5 and higher than 0V as a voltage to be applied between the common electrode 21 and the pixel electrode 9a and measures a potential Vm of the common electrode 21 after the application of the inspection voltage V1 is stopped.

In this manner, the liquid crystal device 1000 of this embodiment applies, as the inspection voltage V1, the inspection voltage V1 that is lower than or equal to the threshold voltage of the liquid crystal layer 5 and higher than 0V, and measures the potential Vm of the common electrode 21 after the application of the inspection voltage V1 is stopped.

Furthermore, the voltage Vm is not affected by the change in the liquid crystal capacitance due to the influence of moving liquid crystal molecules, that is, a change in the permittivity of the liquid crystal, and thus the amount of mobile ions contained in the liquid crystal can be accurately observed.

Further, because the pixel electrode 9a is at a constant potential when the voltage Vm between the common electrode 21 and the pixel electrode 9a is measured, the potential difference between the common electrode 21 and any constant potential including the GND may be measured as the voltage reflecting the voltage Vm. The constant potential used in the liquid crystal device 1000 is, for example, a constant voltage used in the measurement substrate 300, the liquid crystal panel 100, and the control substrate 200.

The constant voltage drives the central control circuit 30 and the like included in the measurement substrate 300, or alternatively, drives the data line drive circuit 23, the scanning line drive circuit 24, and the pre-charge circuit 25 included in the liquid crystal panel 100. Alternatively, the constant voltage drives the drive IC 201 of the control substrate 200.

In the liquid crystal device 1000, the liquid crystal panel 100 applies a drive voltage to the liquid crystal layer 5 for each refresh period of the liquid crystal panel 100 as a first refresh period, and the measurement circuit measures the potential of the common electrode 21 after a period of time that is longer than one refresh period elapses after the application of the inspection voltage is stopped.

Accordingly, the time in which the mobile ions can move between the common electrode 21 and the pixel electrode 9a is ensured due to the elapse of the period of time that is longer than one refresh period. As a result, a change in a discharge curve in accordance with the amount of mobile ions of the liquid crystal layer 5 is efficiently made, and a change in the amount of mobile ions caused by deterioration of the liquid crystal layer 5 can be accurately observed due to the value of the measurement value Vm.

For the liquid crystal device 1000, a period that is longer than one refresh period is a period of 60 ms to 150 ms. In this way, for example, the measurement of the amount of mobile ions can be completed quickly with high sensitivity without unnecessarily increasing the time in which the projection-type display device using the liquid crystal device 1000 needs to be powered on and off.

In the liquid crystal device 1000, the first electrode is the common electrode 21, and the second electrode is the pixel electrode 9a.

The liquid crystal device 1000 displays a state of the liquid crystal panel 100 to the user based on the measurement result of the common electrode 21.

The physical property measurement method for the liquid crystal layer used in the liquid crystal device 1000 is for the liquid crystal device 1000 that has the liquid crystal layer 5 and applies a drive voltage to the liquid crystal layer 5 for each one refresh period as a first refresh period to measure physical properties of the liquid crystal layer 5 of the liquid crystal device 1000, the method including applying the inspection voltage V1 between the common electrode 21 as the first electrode disposed to apply an electric field to the liquid crystal layer 5 and the pixel electrode 9a as the second electrode, setting the period Tb that is longer than one refresh period Ta after the application of the inspection voltage V1 is stopped, and measuring the voltage Vm between the common electrode 21 and the pixel electrode 9a.

In the physical property measurement method for the liquid crystal layer 5 used in the liquid crystal device 1000, a voltage that is lower than or equal to the threshold voltage of the liquid crystal layer 5 and higher than 0 V is applied as the inspection voltage V1.

The physical property measurement method for the liquid crystal layer 5 used in the liquid crystal device 1000 is for the liquid crystal device 1000 that applies the drive voltage that is equal to or higher than the threshold voltage of the liquid crystal layer 5 to measure physical properties of the liquid crystal layer 5, the method including applying the inspection voltage V1 that is lower than or equal to the threshold voltage and higher than 0 V between the common electrode 21 as the first electrode disposed to apply an electric field to the liquid crystal layer 5 and the pixel electrode 9a as the second electrode, and measuring the potential Vm of the common electrode 21 after the application of the inspection voltage V1 is stopped.

In the physical property measurement method for the liquid crystal layer 5 used in the liquid crystal device 1000, the liquid crystal panel 100 applies a drive voltage to the liquid crystal layer 5 for each refresh period of the liquid crystal panel 100 as a first refresh period, and the measurement circuit measures the potential of the common electrode 21 after a period of time that is longer than one refresh period elapses after the application of the inspection voltage is stopped.

2. Second Embodiment

2.1. Overview of Configuration of Liquid Crystal Device

Figure 8:
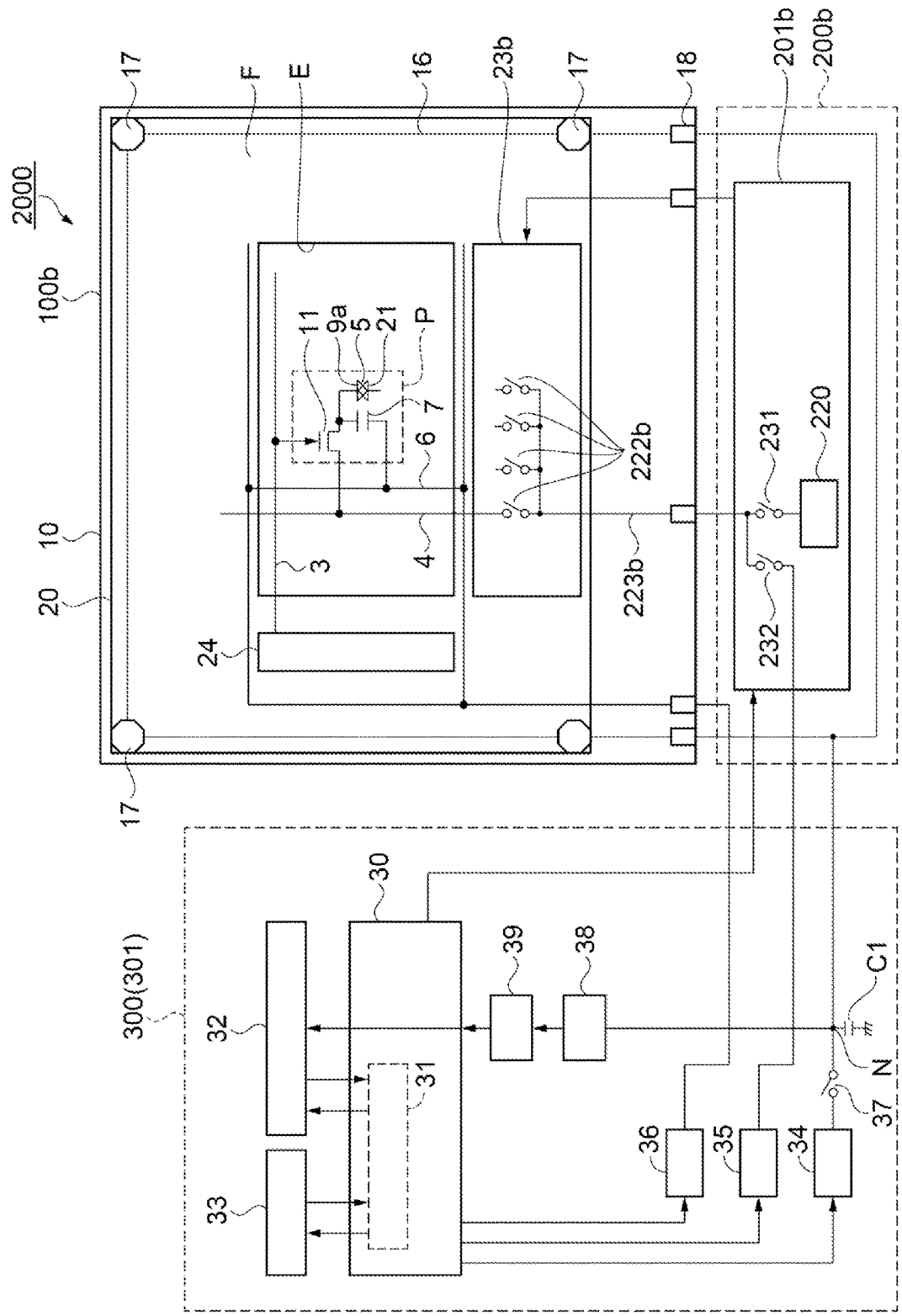
FIG. 8 is an explanatory view illustrating a schematic configuration of a liquid crystal device according to a second embodiment.

FIG. 8 is an explanatory view illustrating a schematic configuration of a liquid crystal device. Further, the same reference numerals will be used for the same configurations and steps of flowcharts as those in the first embodiment, and overlapping descriptions will be omitted below.

A liquid crystal device 2000 of this embodiment includes a liquid crystal panel 100b, a control substrate 200b, and a measurement substrate 300. The liquid crystal panel 100b differs from that of the first embodiment in that a data line drive circuit 23b of the liquid crystal panel 100b includes a demultiplexer circuit composed of a predetermined number of sample switches 222b electrically connected to each of the predetermined number of signal lines 4. The liquid crystal device 2000 also supplies an image signal to each pixel electrode 9a according to a demultiplexing scheme.

A drive IC 201b includes an amplifier 220 that outputs a voltage corresponding to an image signal, a switch 231 that electrically connects the amplifier 220 to an image signal supply line 223b at the time of writing the voltage, and a switch 232 that electrically connects a reference potential generation circuit 35 to the image signal supply line 223b. Unlike in the first embodiment, the drive IC 201b functions as a pre-charge circuit, and the inspection voltage V1 is supplied to the pixel electrode 9a via the switch 232 of the drive IC 201b at the time of measurement in the second embodiment as described above.

2.2. Overview of Configuration of Holding Member of Liquid Crystal Device

Figure 9:
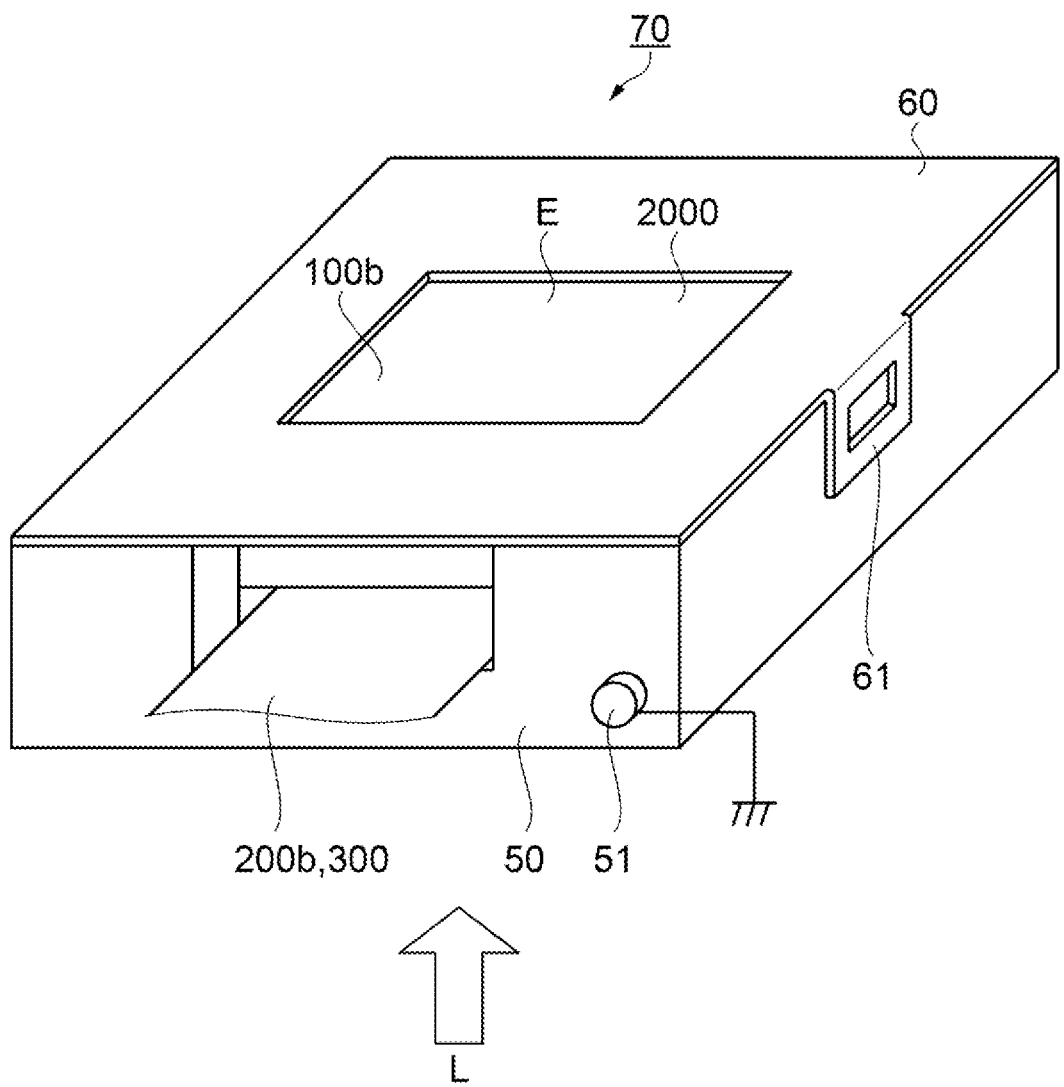
FIG. 9 is an explanatory view illustrating a configuration of a holding member of the liquid crystal device.

FIG. 9 is a perspective view illustrating a configuration of a holding member of the liquid crystal device. The holding member 70 is constituted by a holder 50 and a lid member 60 attached to the holder 50 by a hook 61. The holder 50 and the lid member 60 are both from of a conductive material.

After being housed in the holder 50, the liquid crystal device 2000 is held in the holding member 70 with the lid member 60 mounted thereon. The holder 50 includes a fixing part 51 that serves as a connecting part with respect to the GND, and is electrically connected to the GND via the fixing part 51. In addition, the lid member 60 mounted on the holder 50 is electrically connected to the GND via the holder 50. The lid member 60 has a portion corresponding to the display region E of the liquid crystal panel 100b cut out, and thus it functions as a partition. Although not illustrated, an element substrate 10 is disposed in the holder 50 on the lid member 60 side. In this case, incident light L is radiated from the bottom to the top of FIG. 9. For this reason, a counter substrate 20 is disposed on the incident light side. Further, the lid member 60 may be formed of a non-conductive material, in which case only the holder 50 of the holding member 70 is electrically connected to the GND.

According to the liquid crystal device 2000 of this embodiment as described above, the following effects can be obtained in addition to the effects of the first embodiment. The liquid crystal device 2000 includes the conductive holding member 70 that holds the liquid crystal device 2000, and the liquid crystal device 2000 and the holding member 70 are electrically connected to the GND as well. In the second embodiment, a common electrode 21 of the counter substrate 20 functions as an inspection electrode. When physical properties of the liquid crystal layer 5 are to be measured, a switch 37 is turned off, and the common electrode 21 is electrically separated from an inspection voltage generation circuit 34. Because the common electrode 21 is also an electrode having a large area, it is susceptible to noise from an external circuit in this case. Accordingly, because the holding member 70 is electrically connected to the GND, overlapping of noise on the common electrode 21 serving as the inspection electrode can be curbed, and thus the discharge characteristics can be stably measured.

3. Third Embodiment

3.1. Overview of Configuration of Liquid Crystal Device

Figure 10:
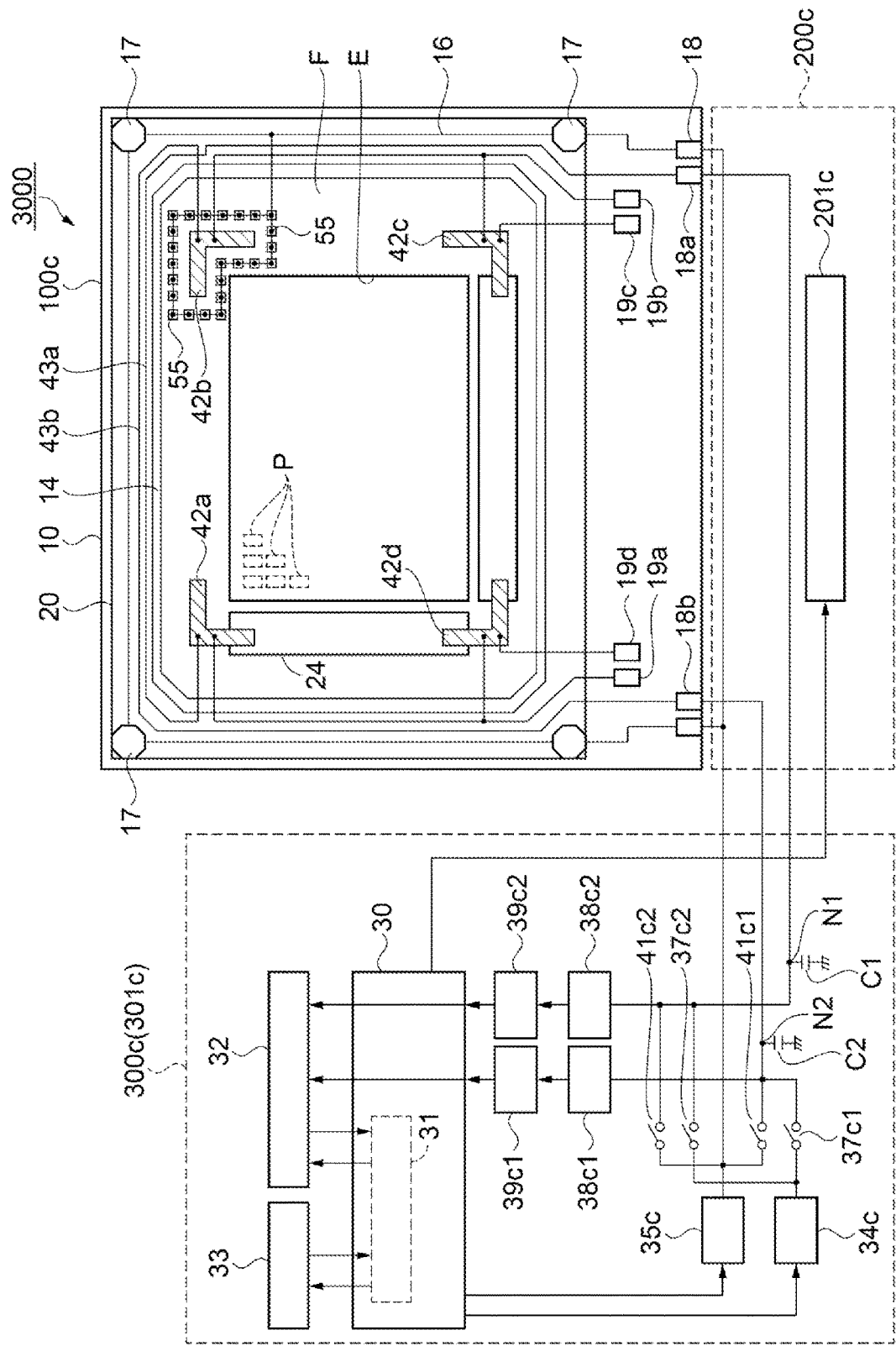
FIG. 10 is an explanatory view illustrating a schematic configuration of a liquid crystal device according to a third embodiment.

FIG. 10 is an explanatory view illustrating a schematic configuration of a liquid crystal device. Further, the same reference numerals will be used for the same configurations and steps of flowcharts as those in each of the above-described embodiments, and overlapping descriptions will be omitted below.

A liquid crystal device 3000 of this embodiment includes a liquid crystal panel 100c, a control substrate 200c, and a measurement substrate 300c. The liquid crystal panel 100c differs from those of the first and second embodiments in that, as inspection electrodes, the liquid crystal panel 100c includes inspection electrodes 42a, 42b, 42c, and 42d in a peripheral region F between a sealing material 14 and a display region E.

Dummy pixel electrodes 55 connected to a common potential line 16 is disposed around the inspection electrode 42b. The dummy pixel electrodes 55 are formed such that, for example, substantially rectangular patterns similar to the pixel electrode 9a are connected to each other at the center of each side. In this case, the gap between the inspection electrode 42b and the dummy pixel electrodes 55 is preferably greater than the gap between the dummy pixel electrodes 55 to prevent the inspection electrode 42b and the dummy pixel electrodes 55 from being electrically short-circuited. The same configuration may be applied to the case in which dummy pixel electrodes 55 are disposed around the other inspection electrodes 42a, 42c, and 42d.

The inspection electrode 42a and the inspection electrode 42c are electrically connected to a connection line 43a, and are electrically connected to a node N1 Via an external connection terminal 18a. In addition, the inspection electrode 42b and the inspection electrode 42d are electrically connected to a connection line 43b, and are electrically connected to a node N2 Via an external connection terminal 18b. Thus, the liquid crystal panel 100c includes two sets of inspection electrode systems connected to different nodes N1 and N2, respectively. The node N1 includes a stabilizing capacitance C1 to stabilize measurement values. Similarly, the node N2 includes a stabilizing capacity C2 to stabilize measurement values.

The main wiring portion of the connection line 43a and the connection line 43b along each side of the element substrate 10 is disposed in the region outside the sealing material 14. By disposing as described above, it is possible to prevent an unnecessary parasitic capacitance formed between the connection line 43a and the fixed potential line and the signal wiring disposed in the peripheral region F, and an unnecessary parasitic capacitance formed by the connection line 43b and the fixed potential line and the signal wiring disposed in the peripheral region F, thereby improving the deterioration detection sensitivity of the inspection electrodes 42a, 42b, 42c, and 42d with respect to the liquid crystal layer 5.

The inspection electrode 42a is electrically connected to a conduction inspection terminal 19a, the inspection electrode 42b is electrically connected to a conduction inspection terminal 19b, the inspection electrode 42c is electrically connected to a conduction inspection terminal 19c, and the inspection electrode 42d is electrically connected to a conduction inspection terminal 19d. The control substrate 200c includes a drive IC 201c. With this configuration, it is possible to inspect conduction by probing the external connection terminal 18a and the conduction inspection terminal 19a to ascertain whether they are electrically connected to the inspection electrode 42a. By probing the external connection terminal 18a and the conduction inspection terminal 19c to inspect conduction, electrical connecting to the inspection electrode 42c can be ascertained. By probing the external connection terminal 18b and the conduction inspection terminal 19b to inspect conduction, electrical connecting to the inspection electrode 42b can be ascertained. By probing the external connection terminal 18b and the conduction inspection terminal 19d to inspect conduction, electrical connecting to the inspection electrode 42d can be ascertained.

The measurement substrate 300c includes an inspection voltage generation circuit 34c, a reference potential generation circuit 35c, amplifying circuits 38c1 and 38c2, and A/D converters 39c1 and 39c2.

The inspection voltage generation circuit 34c is electrically connected to the node N2 via a switch 37c1 and is electrically connected to the node N1 via a switch 37c2. The reference potential generation circuit 35c is electrically connected to the node N2 via a switch 41c1 and is electrically connected to the node N1 via a switch 41c2. These switches 37c1, 37c2, 41c1, and 41c2 are controlled by the central control circuit 30 such that the switches become on or off. Further, the reference potential generation circuit 35c may be designed to function as a common potential generation circuit that outputs a common potential to the common electrode 21 via the inter-substrate conduction part 17 during normal driving.

The amplifying circuit 38c2 is electrically connected to the node N1, and the A/D converter 39c2 converts an output voltage of the amplifying circuit 38c2 into a digital value, and outputs the measurement value to a storage circuit 32 via the central control circuit 30. The amplifying circuit 38c1 is electrically connected to the node N2, and the A/D converter 39c1 converts an output voltage of the amplifying circuit 38c1 into a digital value, and outputs the measurement value to a measurement value storage circuit 32 via the central control circuit 30.

According to the liquid crystal device 3000 of this embodiment as described above, the following effects can be obtained in addition to the effects of the first and second embodiments.

In the liquid crystal device 3000, first electrodes are, in plan view, the inspection electrodes 42a, 42b, 42c, and 42d as peripheral electrodes disposed in the region outside the display region, the second electrode is the common electrode 21, and the measurement circuit 301c applies a reference potential serving as a reference of an inspection voltage to the common electrode 21 and applies an inspection voltage to the inspection electrodes 42a and 42c or the inspection electrodes 42b and 42d. The common electrode 21 that receives the reference potential on the counter substrate 20 side is provided above these inspection electrodes, and various wiring layers that are formed at the element substrate 10 and receive a potential are disposed below the inspection electrodes.

Thus, due to the common electrode 21 and the various wiring layers formed at the element substrate 10 functioning as a shield, stable measurement values can be obtained.

In the liquid crystal panel 100c, the mobile ion easily accumulates in the corners of the display region E, and causes a display failure such as stains at the corners of the display region E. Such mobile ions tend to easily move in the alignment direction of the first alignment film 12 and the second alignment film 22, and for example, stains that occur at the corners of the display region E is likely to occur at the corners facing each other on the diagonal line of the display region E.

Thus, by configuring the inspection electrode 42a and the inspection electrode 42c as a single detection system, and the inspection electrode 42b and the inspection electrode 42d as a single detection system, it is possible detect a sign of stains that occur at the corners of the display region E with reference to a difference value of measurement values of the two systems.

4. Fourth Embodiment 4.1. Overview of Configuration of Liquid Crystal Device

Figure 11:
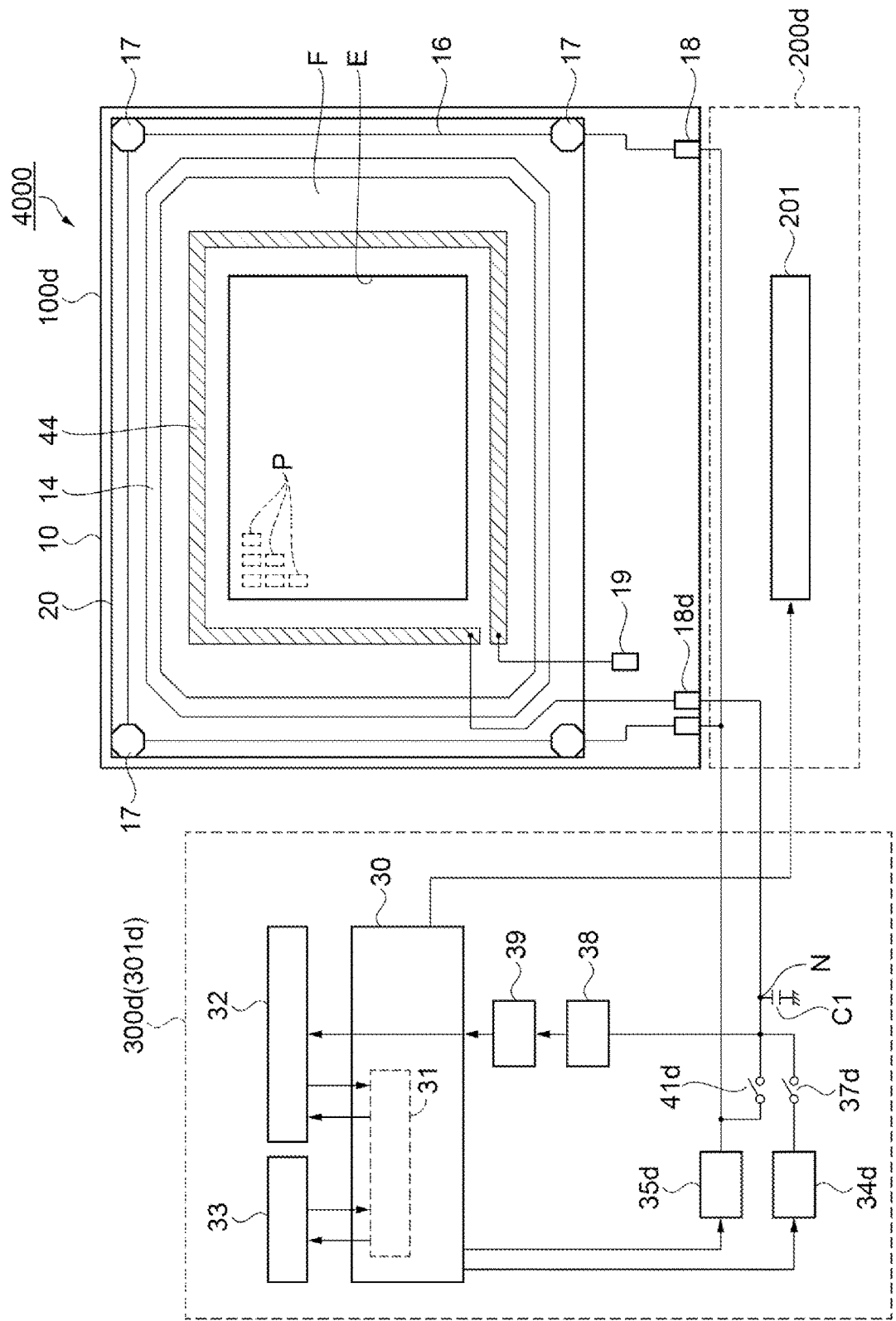
FIG. 11 is an explanatory view illustrating a schematic configuration of a liquid crystal device according to a fourth embodiment.

FIG. 11 is an explanatory view illustrating a schematic configuration of a liquid crystal device. Further, the same reference numerals will be used for the same configurations and steps of flowcharts as those in each of the above-described embodiments, and overlapping descriptions will be omitted below.

A liquid crystal device 4000 of this embodiment includes a liquid crystal panel 100d, a control substrate 200d, and a measurement substrate 300d. The liquid crystal panel 100d includes an inspection electrode 44 in a peripheral region F between a sealing material 14 and a display region E as an inspection electrode. The inspection electrode 44 is disposed to surround the display region E, one end thereof is electrically connected to a node N via an external connection terminal 18d, and the other end thereof is electrically connected to a conduction inspection terminal 19. With this configuration, it is possible to inspect conduction by probing the external connection terminal 18*d* and the conduction inspection terminal 19 to ascertain whether they are electrically connected to the inspection electrode 44. At this time, by designing the inspection electrode 44 to have a cut pattern to provide a part electrically connected to the external connection terminal 18*d* and a part electrically connected to the conduction inspection terminal 19 at both ends of the pattern as illustrated in FIG. 11, even a disconnection defect of the inspection electrode 44 can be detected.

An inspection voltage generation circuit 34*d* is electrically connected to the node N via a switch 37*d*. A reference potential generation circuit 35*d* is electrically connected to the node N via a switch 41*d* and is electrically connected to an inter-substrate conduction part 17. Further, the reference potential generation circuit 35*d* functions as a common potential generation circuit that outputs a common potential to a common electrode 21 via the inter-substrate conduction part 17 during normal driving.

According to the liquid crystal device 4000 of this embodiment as described above, the following effects can be obtained in addition to the effects of the first, second, and third embodiments.

In the liquid crystal device 4000, the inspection electrode 44 as a peripheral electrode is disposed along the display region E. Due to the inspection electrode 44 being disposed along the display region E in the peripheral region F, the area of the inspection electrode 44 can be increased. Thus, the deterioration detection sensitivity of the inspection electrode 44 with respect to the liquid crystal layer 5 can be increased.

According to the liquid crystal device 4000 of this embodiment as described above, the following effects can be obtained in addition to the effects of the first, second, and third embodiments. In the liquid crystal device 4000, the first electrode is, in plan view, the inspection electrode 44 as a peripheral electrode disposed in the region outside the display region, the second electrode is the common electrode 21, and the measurement circuit 301*d* applies a reference potential serving as a reference of an inspection voltage to the common electrode 21 and applies an inspection voltage to the inspection electrode 44.

In the liquid crystal panel 100*c*, the mobile ion easily accumulates in the corners of the display region E, and causes a display failure such as stains at the corners of the display region E. Thus, because the inspection electrode 44 is disposed at the position in the peripheral region F corresponding to the corners of the display region E as described in this embodiment, mobile ions are easy to detect.

5. Fifth Embodiment

5.1. Overview of Electronic Apparatus

Figure 12:
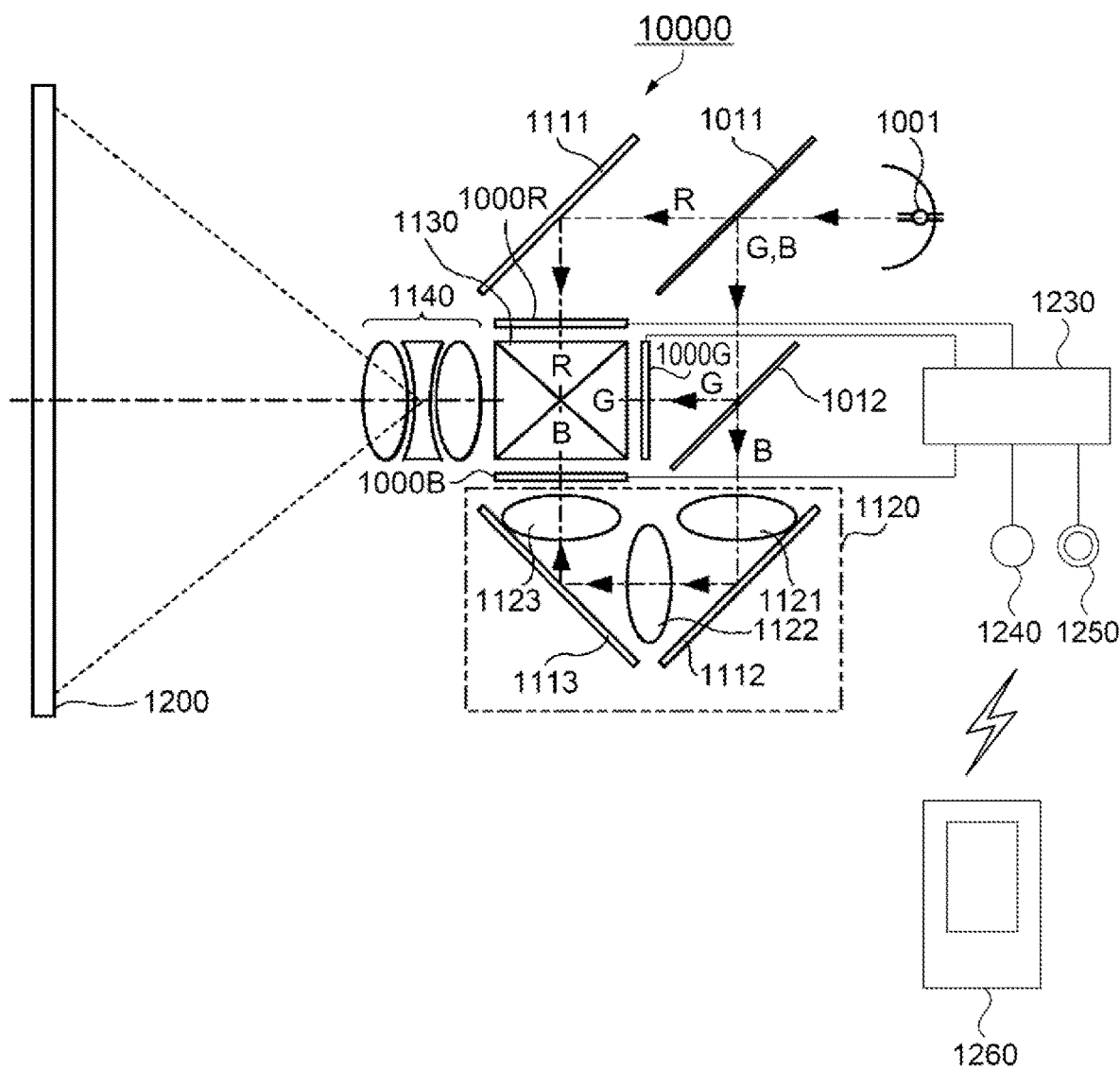
FIG. 12 is an explanatory view illustrating a schematic configuration of an electronic apparatus according to a fifth embodiment.

FIG. 12 is a schematic configuration view illustrating a configuration of a projection-type display device as an electronic apparatus according to this embodiment. A projection-type display device 10000 will be described in this embodiment as an example of an electronic apparatus with the above-described liquid crystal device 1000.

The projection-type display device 10000 according to this embodiment is a three-plate projection-type display device, and includes a lamp unit 1001 as a light source, dichroic mirrors 1011 and 1012 as a color-separating optical system, a liquid crystal device 1000B corresponding to blue light B, a liquid crystal device 1000G corresponding to green light G, a liquid crystal device 1000R corresponding to red light R, three reflection mirrors 1111, 1112, and 1113, three relay lenses 1121, 1122, and 1123, a dichroic prism 1130 as a color-combining optical system, and a projection lens 1140 as a projection optical system. A video is projected onto a screen 1200 due to the projection optical system. Further, the relay lenses 1121, 1122, and 1123, and the reflection mirrors 1112 and 1113 constitute a relay lens system 1120.

The projection-type display device 10000 further includes a control circuit 1230 that receives measurement data of a deterioration state of the liquid crystal layer 5 transmitted from the liquid crystal devices 1000B, 1000G, and 1000R, and perform predetermined control based on the received measurement data.

When the control circuit 1230 receives data of a deterioration state of the liquid crystal layer 5 from each of the liquid crystal devices 1000B, 1000G, and 1000R, the control circuit 1230 creates and displays display information related to the deterioration state of the liquid crystal layer 5 for each of the liquid crystal devices 1000B, 1000G, and 1000R.

Further, the control circuit 1230 can report that the end of the life of the liquid crystal panel 100 is near by turning on a pilot lamp 1240 based on the measurement data of the deterioration state of the liquid crystal layer 5. For example, when the end of life of the liquid crystal panel 100 of the liquid crystal device 1000B corresponding to blue is near, the blue pilot lamp 1240 is turned on. In addition, the control circuit 1230 may use a speaker 1250 to report the state of the liquid crystal panel 100 using sound. In addition, the control circuit 1230 may report the state of the liquid crystal panel 100 on a remote controller 1260 or the screen of a portable terminal. As described above, a section for reporting a state of the liquid crystal panel 100 may be provided, in addition to the display for the liquid crystal devices 1000B, 1000G, and 1000R.

Furthermore, when detecting that the end of life of the liquid crystal panel 100 is near based on the received measurement data, the control circuit 1230 changes a control value related to control of the liquid crystal devices 1000B, 1000G, and 1000R in order to delay deterioration of the liquid crystal layer 5. For example, by changing the control value, brightness of the lamp unit 1001 radiated to the liquid crystal devices 1000B, 1000G, and 1000R may be lowered, a gradation voltage of the liquid crystal devices 1000B, 1000G, and 1000R may be changed to a voltage value corresponding to a decrease in brightness of the lamp unit 1001, or the like.

5.2. Overview of Example of Display Screen of Measurement Result

Figure 13A:
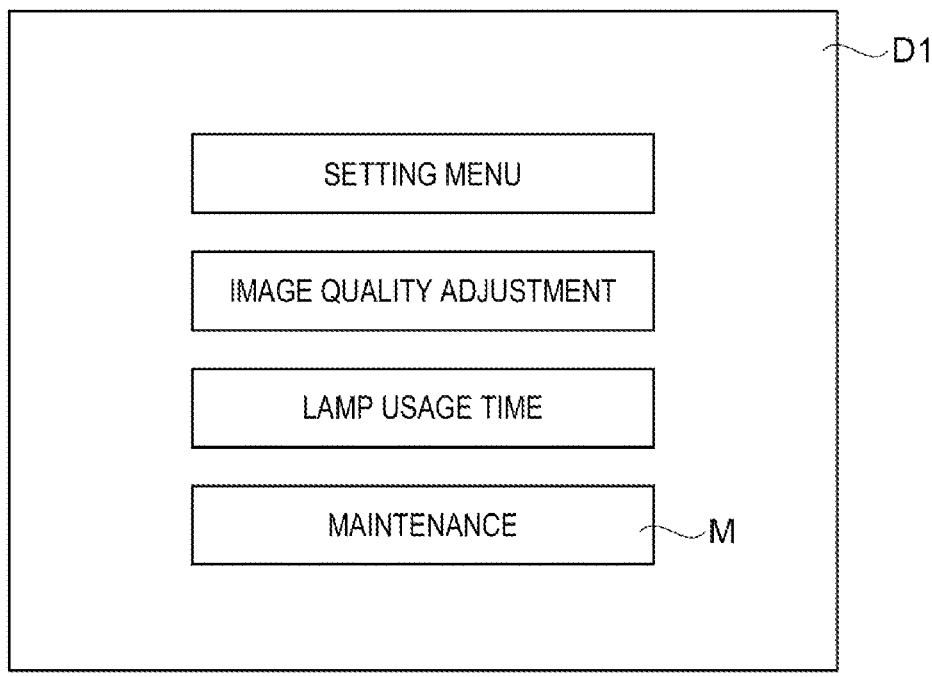
FIG. 13A is an explanatory view illustrating an exemplary setting menu screen of a projection-type display device as an electronic apparatus.
Figure 13B:
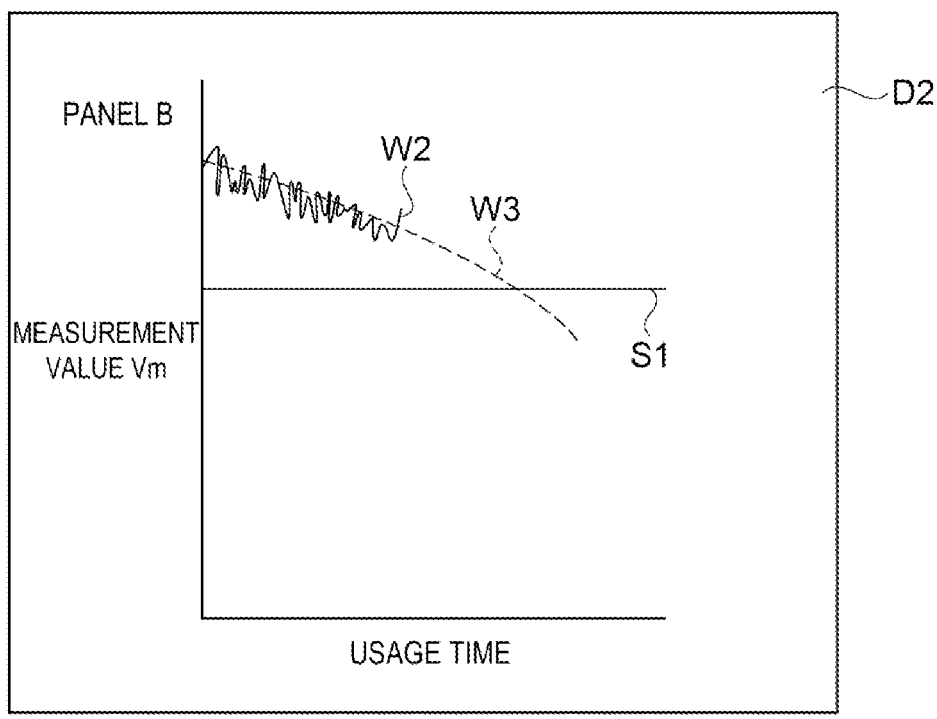
FIG. 13B is an explanatory view illustrating an exemplary display screen displaying a deterioration state of a liquid crystal layer.

FIG. 13A is an explanatory diagram illustrating an example of a setting menu screen of the projection-type display device 10000, and FIG. 13B is an explanatory diagram illustrating an example of a display screen for displaying a deterioration state of the liquid crystal layer 5.

In FIG. 13A, when maintenance M is selected from the setting menu screen D1 projected and displayed on the screen 1200, the maintenance menu is displayed, and "display of state of liquid crystal panel 100" is selected from the menu, the control circuit 1230 transmits a request for transmitting the measurement data of the deterioration state of the liquid crystal layer 5 to the liquid crystal devices 1000B, 1000G, and 1000R, and displays a display screen D2 as illustrated in FIG. 13B based on the received measurement data of the deterioration state of the liquid crystal layer 5 of the liquid crystal devices 1000B, 1000G, and 1000R.

The display screen D2 in FIG. 13B is a screen showing a deterioration state of the liquid crystal layer 5 of the liquid crystal device 1000B. Further, screens showing the deterioration states of the liquid crystal layer 5 of the liquid crystal devices 1000G and 1000R may be individually displayed by switching the screens.

A transition line W2 indicating a history of a measurement value Vm from the start of use of the liquid crystal device 1000B to the present, an expected transition line W3 under a standard use condition, and a line of a threshold S1 indicating that the end of life of the liquid crystal panel 100 is near are displayed on the display screen D2. Further, information of the liquid crystal devices 1000G and 1000R may also be displayed together on the display screen D2. By comparing the transition line W2 with the expected transition line W3, it is possible to determine whether the use condition is more severe than expected, and thus it is possible to perform preventive maintenance such as limiting brightness of the lamp unit 1001 that radiates light to the liquid crystal devices 1000B, 1000G, and 1000R. Then, after the transition line W2 is improved to the expected transition line W3, the limit on the brightness of the lamp unit 1001 may be canceled.

To make it easier to determine a change trend of the transition line W2 indicating the history of the measurement value Vm, it may be possible to display a smooth line that can be obtained by averaging a plurality of measurement values Vm. Furthermore, a value of the measurement value Vm may simply be displayed as a numerical value, in addition to indicating the transition line W2 indicating the history of the measurement value Vm. At this time, display color of the value of the measurement value Vm may be changed by comparing it with the threshold S1. For example, the value may be displayed in green if it is greater than the threshold S1, displayed in yellow if it is close to the threshold S1, and displayed in red if it is lower than or equal to the threshold S1.

Furthermore, the measurement value Vm may be displayed as an index value normalized to any value. In this case, for example, when the index value is calculated from the measurement value in step S12 of the first embodiment, the index value displayed shortly after the start of use is, for example, a value close to "1".

If the value is indicated as percentage, it is a value close to "100", for example. Alternatively, if the index value is calculated from the measurement value in step S16 of the first embodiment, the index value displayed shortly after the start of use is, for example, a value close to "0". Using such an index value, a deterioration state of the liquid crystal panel 100 may be displayed, for example, using a bar chart or a pie chart.

When power of the projection-type display device 10000 is turned on, turned off, and measurement of a deterioration state of the liquid crystal layer 5 is instructed from the maintenance menu, the control circuit 1230 transmits a measurement instruction command for the deterioration state of the liquid crystal layer 5 to the liquid crystal devices 1000B, 1000G, and 1000R. As described in step S10 of the flowchart of FIG. 4, upon receiving the measurement instruction command for the deterioration state of the liquid crystal layer 5 from the control circuit 1230, the liquid crystal devices 1000B, 1000G, and 1000R start measurement.

Typically, preventative maintenance means planned maintenance to stably operate an apparatus. Standard determination for component replacement at this time or the like includes a method for classifying component replacement based on the usage time of a component and a method of evaluating the degree of deterioration of a component. If the liquid crystal panel 100 according to the present disclosure is used, it is possible to obtain a state of increase in mobile ions, which is a deterioration index of the liquid crystal layer 5 of the liquid crystal panel 100, as a value of the measurement value Vm. A change in the measurement value Vm can be observed with satisfactory sensitivity before a display defect of the liquid crystal panel 100 emerges, and thus preventive maintenance can be performed. In addition, the trends of transition of the measurement value Vm of a large number of entities can be compared with each other, the behavior of the measurement value Vm that is likely to occur, such as stains, or irregularities can be detected through analysis using machine learning to perform predictive maintenance. For example, according to the third embodiment, the disclosure can be applied to pre-detection of a stain that is likely to occur at a corner of the display region E.

Although the projection-type display device 10000 is exemplified as an electronic apparatus in this embodiment, the electronic apparatus to which the liquid crystal device 1000 is applied is not limited thereto. For example, the device may be applied to an electronic apparatus such as a 3D printer, a head-up display (HUD), a head-mounted display (HMD), a personal computer, a digital camera, a liquid crystal television, or the like in which a resin solution is cured using light emitted from the liquid crystal panel 100. For example, some 3D printers using the liquid crystal panel 100 use UV light, and deterioration of the liquid crystal panel 100 is a problem. When molding of the liquid crystal panel 100 is started without being aware of the fact that the end of life of the liquid crystal panel 100 is approaching, it may cause a defect in curing of the resin solution in the middle of the molding, but no one is aware of the defect until the manufacturing ends. Here, if the liquid crystal panel 100 according to the present disclosure is used, the deterioration state of the liquid crystal panel 100 is determined. Therefore, the liquid crystal panel 100 can be replaced at an appropriate time as preventive maintenance by anticipating the occurrence of a defect in curing of the resin solution at the time of molding in advance.

Although a transmissive liquid crystal device has been introduced as the liquid crystal device 1000 in the embodiment described above, the liquid crystal device 1000 may be a reflection-type liquid crystal device or a liquid crystal-on-silicon (LCOS) liquid crystal device.

According to the projection-type display device 10000 of this embodiment as described above, the following effects can be obtained in addition to the effects of each of the embodiments. The projection-type display device 10000 as an electronic apparatus preferably includes the liquid crystal device 1000, 2000, 3000 or 4000 according to each of above-described embodiments.

The projection-type display device 10000 as an electronic apparatus further includes the control circuit 1230, and the control circuit 1230 reports a deterioration state of the liquid crystal layer 5 based on measurement results of the measurement circuit 301.

The projection-type display device 10000 as an electronic apparatus further includes the control circuit 1230, and the control circuit 1230 changes a control value of the liquid crystal device 1000 based on measurement results of the measurement circuit 301. According to these configurations, it is possible to provide an excellent electronic apparatus that can implement preventive maintenance according to a deterioration state of the liquid crystal layer 5.

What is claimed is:

1. A liquid crystal device comprising:
a first electrode;
a second electrode;
a liquid crystal layer to which a drive voltage is applied in each first refresh period of time of the liquid crystal layer; and
a measurement circuit configured to apply an inspection voltage to the liquid crystal layer between the first electrode and the second electrode, and measure a voltage potential of the first electrode after a period of time, that is longer than the first refresh period, has elapsed after the application of the inspection voltage is stopped.

2. The liquid crystal device according to claim 1, wherein the measurement circuit applies, as the inspection voltage, a voltage that is lower than or equal to a threshold voltage of the liquid crystal layer and higher than 0 V.

3. The liquid crystal device according to claim 1, wherein the first electrode is a common electrode; and
the second electrode is a pixel electrode.

4. The liquid crystal device according to claim 3, further comprising:
a conductive holding member configured to hold the liquid crystal device, wherein
the liquid crystal device and the holding member are electrically connected to the same GND.

5. The liquid crystal device according to claim 1, wherein the first electrode is a peripheral electrode disposed in a region outside a display region in plan view, and
the second electrode is a common electrode.

6. The liquid crystal device according to claim 5, wherein the peripheral electrode is disposed along the display region.

7. The liquid crystal device according to claim 1, wherein display corresponding to a measurement result of the voltage potential of the first electrode is performed.

8. An electronic apparatus comprising the liquid crystal device according to claim 1.

9. The electronic apparatus according to claim 8, wherein the measurement circuit measures physical properties of the liquid crystal layer at the time when the electronic apparatus is started or stopped.

10. The electronic apparatus according to claim 8, further comprising a control circuit, wherein
the control circuit reports information corresponding to a measurement result of the measurement circuit.

11. The electronic apparatus according to claim 8, further comprising a control circuit, wherein
the control circuit changes a control value of the liquid crystal device based on a measurement result of the measurement circuit.

12. A liquid crystal device comprising:
a first electrode;
a second electrode;
a liquid crystal layer to which a drive voltage that is equal to or higher than a threshold voltage is applied; and
a measurement circuit configured to apply an inspection voltage that is lower than or equal to the threshold voltage of the liquid crystal layer and higher than 0 V as a voltage to be applied to the liquid crystal layer between the first electrode and the second electrode and measure a voltage potential of the first electrode after the application of the inspection voltage is stopped.

13. The liquid crystal device according to claim 12, wherein
a drive voltage is applied to the liquid crystal layer in each first refresh period of time of the liquid crystal layer, and
the measurement circuit measures a voltage potential of the first electrode after a period of time, that is longer than the first refresh period, has elapsed after the application of the inspection voltage is stopped.

14. A physical property measurement method for a liquid crystal layer in a liquid crystal device that applies a drive voltage that is equal to or higher than a threshold voltage of the liquid crystal layer, the method comprising:
applying an inspection voltage that is lower than or equal to the threshold voltage and higher than 0 V to the liquid crystal layer between a first electrode and a second electrode that are disposed to apply an electric field to the liquid crystal layer; and
detecting a voltage potential of the first electrode after the application of the inspection voltage is stopped.

15. The physical property measurement method for a liquid crystal layer according to claim 14, wherein
a drive voltage is applied to the liquid crystal layer in each first refresh period of time of the liquid crystal layer, and
a measurement circuit measures a voltage potential of the first electrode after a period of time, that is longer than the first refresh period, has elapsed after the application of the inspection voltage is stopped.

* * * * *